(12) United States Patent
Imura et al.

(10) Patent No.: US 11,821,521 B2
(45) Date of Patent: Nov. 21, 2023

(54) SLIDING COMPONENT

(71) Applicant: EAGLE INDUSTRY CO., LTD., Tokyo (JP)

(72) Inventors: Tadatsugu Imura, Tokyo (JP); Hiroshi Suzuki, Tokyo (JP); Yuichiro Tokunaga, Tokyo (JP)

(73) Assignee: EAGLE INDUSTRY CO., LTD.

(*) Notice: Subject to any disclaimer, the term of this patent is extended or adjusted under 35 U.S.C. 154(b) by 180 days.

(21) Appl. No.: 17/413,466

(22) PCT Filed: Dec. 19, 2019

(86) PCT No.: PCT/JP2019/049870
§ 371 (c)(1),
(2) Date: Jun. 11, 2021

(87) PCT Pub. No.: WO2020/130087
PCT Pub. Date: Jun. 25, 2020

(65) Prior Publication Data
US 2022/0056956 A1 Feb. 24, 2022

(30) Foreign Application Priority Data
Dec. 21, 2018 (JP) ................................ 2018-240271

(51) Int. Cl.
*F16J 15/34* (2006.01)
(52) U.S. Cl.
CPC ......... *F16J 15/342* (2013.01); *F16J 15/3412* (2013.01)
(58) Field of Classification Search
CPC ..... F16J 15/3412; F16J 15/342; F16J 15/3424
See application file for complete search history.

(56) References Cited

U.S. PATENT DOCUMENTS

| 3,085,808 A | 4/1963 | Williams | 277/388 |
| 3,232,680 A | 2/1966 | Clark | 384/110 |
| 3,410,565 A | 11/1968 | Williams | 277/348 |
| 3,466,052 A | 9/1969 | Ludwig | |
| 3,499,653 A | 3/1970 | Gardner | 277/27 |
| 3,527,465 A | 9/1970 | Guinard | 277/400 |
| 3,656,227 A | 4/1972 | Weinand | 29/530 |

(Continued)

FOREIGN PATENT DOCUMENTS

| CN | 1364987 | 8/2002 | ............... F16J 15/40 |
| CN | 2534429 | 2/2003 | ............... F16J 15/40 |

(Continued)

OTHER PUBLICATIONS

Chinese Office Action issued in application No. 201980087670.2 (with translation), dated Jul. 1, 2022 (17 pgs).

(Continued)

*Primary Examiner* — Nicholas L Foster
(74) *Attorney, Agent, or Firm* — HAYES SOLOWAY P.C.

(57) ABSTRACT

A sliding surface of an annular sliding component disposed at a relatively rotating position of a rotating machine is provided with a plurality of dynamic pressure generating groove groups arranged in a circumferential direction, each including a plurality of dynamic pressure generating grooves having a start point opening to one radial edge of the sliding surface S and an end point closing within the sliding surface while extending circumferentially, in the circumferential direction.

17 Claims, 11 Drawing Sheets

(56) References Cited

U.S. PATENT DOCUMENTS

| | | | |
|---|---|---|---|
| 3,804,424 A | 4/1974 | Gardner | 277/27 |
| 4,406,466 A | 9/1983 | Geary, Jr. | 277/347 |
| 4,486,026 A | 12/1984 | Furumura et al. | 277/80 |
| 5,092,612 A | 3/1992 | Victor | 277/400 |
| 5,201,531 A | 4/1993 | Lai | F16J 15/3412 |
| 5,222,743 A | 6/1993 | Goldswain | 277/400 |
| 5,385,409 A | 1/1995 | Ide | F16J 15/3432 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,498,007 A | 3/1996 | Kulkarni | 277/366 |
| 5,501,470 A | 3/1996 | Fuse | 277/400 |
| 5,529,318 A * | 6/1996 | Fuse | F16J 15/3412 277/400 |
| 5,556,111 A | 9/1996 | Sedy | 277/96.1 |
| 5,605,339 A * | 2/1997 | Pecht | F16J 15/3412 277/400 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,189,896 B1 | 2/2001 | Dickey et al. | F16L 17/06 |
| 6,446,976 B1 | 9/2002 | Key | 277/367 |
| 6,575,470 B1 | 6/2003 | Gacek | F16J 15/3412 |
| 6,817,766 B2 | 11/2004 | Gomyo | F16C 32/06 |
| 7,510,330 B2 | 3/2009 | Obara | F16C 32/06 |
| 7,568,839 B2 | 8/2009 | Gotoh et al. | F16C 32/06 |
| 7,758,051 B2 | 7/2010 | Roberts-Haritonov et al. F16J 15/34 |  |
| 9,062,775 B2 | 6/2015 | Short et al. | F16J 15/34 |
| 9,353,865 B2* | 5/2016 | Lattin | F16N 21/00 |
| 9,353,867 B2 | 5/2016 | Itadani | F16J 15/342 |
| 9,371,912 B2 | 6/2016 | Hosoe et al. | F16J 15/34 |
| 9,587,745 B2 | 3/2017 | Itadani et al. | F16J 15/3412 |
| 9,677,670 B2 | 6/2017 | Itadani et al. | F16J 15/34 |
| 9,829,109 B2 | 11/2017 | Itadani et al. | F16J 15/3412 |
| 9,845,886 B2 | 12/2017 | Itadani | F16C 17/045 |
| 9,951,873 B2 | 4/2018 | Inoue et al. | F16J 15/34 |
| 9,982,784 B2 | 5/2018 | Osada et al. | F16J 15/34 |
| 10,054,230 B2 | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 | 1/2019 | Yoshida | F16J 15/3412 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 | 9/2019 | Miyazaki | F16J 15/3272 |
| 10,473,220 B2 | 11/2019 | Tokunaga et al. | F16J 15/342 |
| 10,487,944 B2 | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2 | 5/2020 | Itadani | F16J 15/342 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 | 5/2021 | Itadani | F16J 15/3284 |
| 11,125,335 B2 | 9/2021 | Kimura et al. | F16J 15/34 |
| 11,221,071 B2 | 1/2022 | Sasaki | F16C 17/04 |
| 11,525,512 B2 | 12/2022 | Kimura | F16J 15/3412 |
| 11,530,749 B2 | 12/2022 | Kimura | F16J 15/447 |
| 11,603,934 B2 | 3/2023 | Imura | F16J 15/3412 |
| 11,644,100 B2 | 5/2023 | Kimura | F16J 15/324 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0141789 A1 | 6/2005 | Kita et al. | F16C 32/06 |
| 2005/0212217 A1 | 9/2005 | Tejima | 277/399 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0189294 A1 | 7/2013 | Koelle et al. | F16J 15/34 |
| 2013/0209011 A1 | 8/2013 | Tokunaga | F16C 32/0633 |
| 2015/0115537 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 | 9/2015 | Inoue et al. | F16J 15/342 |
| 2015/0377297 A1 | 12/2015 | Tokunaga et al. | F16C 33/748 |
| 2015/0377360 A1 | 12/2015 | Itadani | F16J 15/3412 |
| 2016/0033045 A1 | 2/2016 | Itadani et al. | F16J 15/3412 |
| 2016/0097457 A1 | 4/2016 | Sun et al. | F16J 15/34 |
| 2016/0252182 A1 | 9/2016 | Itadani et al. | F16J 15/34 |
| 2017/0009889 A1 | 1/2017 | Seki | F16J 15/3272 |
| 2017/0198814 A1 | 7/2017 | Colombo et al. | F16J 15/3412 |
| 2017/0234431 A1 | 8/2017 | Katori et al. | F16J 15/3412 |
| 2018/0051809 A1 | 2/2018 | Yoshida | F16J 15/3412 |
| 2018/0058584 A1 | 3/2018 | Miyazaki | F16J 15/164 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/342 |
| 2019/0178386 A1 | 6/2019 | Arai | F16J 15/3496 |
| 2019/0301522 A1 | 10/2019 | Negishi et al. | F16C 17/026 |
| 2019/0376558 A1* | 12/2019 | Kimura | F16C 33/743 |
| 2021/0080006 A1 | 3/2021 | Sasaki | F16J 15/34 |
| 2021/0116029 A1 | 4/2021 | Kimura | F16J 15/324 |
| 2021/0116030 A1 | 4/2021 | Kimura | F16J 15/3412 |
| 2021/0116032 A1 | 4/2021 | Kimura | F16J 15/188 |
| 2021/0164571 A1 | 6/2021 | Kimura | F16J 15/3412 |
| 2022/0010835 A1 | 1/2022 | Inoue | F16C 17/045 |
| 2022/0099191 A1 | 3/2022 | Suzuki | F16C 33/103 |
| 2022/0275828 A1* | 9/2022 | Inoue | F16J 15/3424 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 105683632 | 6/2016 | F04D 29/10 |
| CN | 106439037 | 2/2017 | F16J 15/34 |
| CN | 206017723 | 3/2017 | F16J 15/16 |
| CN | 107166036 | 9/2017 | F16J 15/16 |
| CN | 107532724 | 1/2018 | F16J 15/34 |
| CN | 107676484 | 2/2018 | F16J 15/3232 |
| CN | 108506494 | 9/2018 | F16J 15/34 |
| DE | 36 19 489 | 12/1987 | F16J 15/34 |
| DE | 4407453 | 9/1995 | F16C 17/08 |
| EP | 0637706 | 8/1993 | F16J 15/34 |
| EP | 0896163 | 2/1999 | F16C 33/10 |
| EP | 2520835 | 11/2012 | F16J 15/34 |
| EP | 2626604 | 8/2013 | F16J 15/34 |
| EP | 2977655 | 1/2016 | F16J 15/34 |
| EP | 3091258 | 11/2016 | F16J 15/34 |
| EP | 3299686 | 3/2018 | F16J 15/34 |
| EP | 3514414 | 7/2019 | F16J 15/34 |
| EP | 3922872 | 12/2021 | F16J 15/34 |
| EP | 3926187 | 12/2021 | F16C 17/04 |
| EP | 3926188 | 12/2021 | F16C 17/04 |
| EP | 3943765 | 1/2022 | F16C 17/04 |
| GB | 1509482 | 5/1978 | F16C 33/10 |
| JP | 36-6305 | 5/1961 | |
| JP | S49-33614 | 9/1974 | F16J 15/34 |
| JP | S54-77305 | 6/1979 | B06B 9/10 |
| JP | S55-177549 | 12/1980 | F16J 15/16 |
| JP | S57-146955 | 9/1982 | F16J 15/34 |
| JP | 58-109771 | 6/1983 | F16J 15/34 |
| JP | 58-137667 | 8/1983 | F16J 15/40 |
| JP | S59-58252 | 4/1984 | F16J 15/34 |
| JP | S60-107461 | 7/1985 | B63H 23/36 |
| JP | S6182177 | 5/1986 | F16J 15/34 |
| JP | S62-37572 | 2/1987 | F16J 51/34 |
| JP | S63-033027 | 3/1988 | F16C 33/46 |
| JP | S63-190975 | 8/1988 | F16J 15/34 |
| JP | H01133572 | 9/1989 | F16J 15/34 |

(56) References Cited

FOREIGN PATENT DOCUMENTS

| JP | 2-236067 | 9/1990 | ............... F16J 15/34 |
|---|---|---|---|
| JP | 3-14371 | 2/1991 | ............... F16J 15/34 |
| JP | 3-35372 | 4/1991 | ............... F16J 15/34 |
| JP | 3-41267 | 4/1991 | ............... F16J 15/34 |
| JP | 3-41268 | 4/1991 | ............... F16J 15/34 |
| JP | H04-73 | 1/1992 | ............... F16J 15/34 |
| JP | H04-145267 | 5/1992 | ............... F16J 15/34 |
| JP | H04-96671 | 8/1992 | ............... F16J 15/34 |
| JP | H05-90048 | 12/1993 | ............... F16J 15/34 |
| JP | H05-322050 | 12/1993 | ............... F16J 15/34 |
| JP | H07-55016 | 3/1995 | ............... F16J 15/34 |
| JP | H08-89489 | 4/1996 | ............... A61B 5/05 |
| JP | H09-503276 | 3/1997 | ............... F16J 15/34 |
| JP | H09-329247 | 12/1997 | ............... F16J 15/34 |
| JP | H10-38093 | 2/1998 | ............... F16J 15/34 |
| JP | H10-281299 | 10/1998 | ............... F16J 15/34 |
| JP | 2000-179543 | 6/2000 | ............... F16C 17/10 |
| JP | 2001-295833 | 10/2001 | ............... F16C 17/04 |
| JP | 2001-317638 | 11/2001 | ............... F16J 15/34 |
| JP | 2003-161322 | 6/2003 | ............... F16C 33/10 |
| JP | 2003-343741 | 12/2003 | ............... F16J 15/34 |
| JP | 2004-003578 | 1/2004 | ............... F16J 15/34 |
| JP | 2005-188651 | 7/2005 | ............... F16J 15/34 |
| JP | 2005-58051 | 12/2005 | ............... F16C 33/74 |
| JP | 2006-9828 | 1/2006 | ............... F16C 17/02 |
| JP | 2006-022834 | 1/2006 | ............... F16J 15/34 |
| JP | 2006-77899 | 3/2006 | ............... F16J 15/34 |
| JP | 2008-144864 | 6/2008 | ............... F16C 33/10 |
| JP | 2009-250378 | 10/2009 | ............... F16J 15/34 |
| JP | 2010-133496 | 6/2010 | ............... F16J 15/34 |
| JP | 2010-216587 | 9/2010 | ............... F16J 15/34 |
| JP | 2011-185292 | 9/2011 | ............... F16J 15/34 |
| JP | 2012-2295 | 1/2012 | ............... F16J 15/34 |
| JP | 5271858 | 5/2013 | ............... F16J 15/34 |
| JP | 2016-80090 | 5/2016 | ............... F16J 15/34 |
| JP | 2017-141961 | 8/2017 | ............... F16J 15/34 |
| JP | 6444492 | 12/2018 | ............... F16J 15/34 |
| JP | 2019-15401 | 1/2019 | ............... F16J 15/34 |
| WO | WO 95/06832 | 3/1995 | ............... F16J 15/34 |
| WO | WO 2012/046749 | 4/2012 | ............... F16J 15/34 |
| WO | WO 2014/024742 | 2/2014 | ............... F16J 15/34 |
| WO | WO 2014/050920 | 4/2014 | ............... F16J 15/34 |
| WO | WO 2014/103630 | 7/2014 | ............... F16J 15/34 |
| WO | WO 2014/112455 | 7/2014 | ............... F16J 15/34 |
| WO | WO2014103631 | 7/2014 | ............... F16J 15/34 |
| WO | WO 2014/148316 | 9/2014 | ............... F16J 15/34 |
| WO | WO 2014/174725 | 10/2014 | ............... F16J 15/34 |
| WO | WO 2016/009408 | 1/2016 | ............... F16J 15/34 |
| WO | WO 2016/035860 | 3/2016 | ............... F16J 15/34 |
| WO | WO 2016/167262 | 10/2016 | ............... F16J 15/34 |
| WO | WO 2016/186019 | 11/2016 | ............... F16J 15/34 |
| WO | WO2016203878 | 12/2016 | ............... F16J 15/34 |
| WO | WO 2017/002774 | 1/2017 | ............... F16J 15/34 |
| WO | WO 2018/034197 | 2/2018 | ............... F16J 15/34 |
| WO | WO 2018/105505 | 6/2018 | ............... F16J 15/34 |
| WO | WO2018139231 | 8/2018 | ............... F16J 15/34 |
| WO | WO-2018139231 A1 * | 8/2018 | ............ F16C 17/045 |
| WO | WO2018139232 | 8/2018 | ............... F16C 33/10 |

OTHER PUBLICATIONS

Chinese Office Action issued in application No. 201980043720.7 (with translation), dated Jun. 6, 2022 (12 pgs).
Chinese Office Action issued in application No. 202080014381.2 (with translation), dated Aug. 11, 2022 (15 pgs).
Chinese Office Action issued in application No. 202080012994.2 (with translation), dated Aug. 29, 2022 (14 pgs).
European Official Action issued in related European Patent Application Serial No. 19869466.3, dated May 19, 2022, 9 pages.
European Official Action issued in related European Patent Application Serial No. 19876680.0, dated Jun. 3, 2022, 8 pages.
European Official Action issued in related European Patent Application Serial No. 19888532.9, dated Jul. 8, 2022, 7 pages.
European Official Action issued in related European Patent Application Serial No. 19899646.4, dated Aug. 12, 2022, 9 pages.
Korean Office Action issued in application No. 10-2020-7037305 (with translation), dated Jun. 24, 2022 (17 pgs).
Korean Office Action issued in application No. 10-2021-7002193 (with translation), dated Jul. 18, 2022 (13 pgs).
Office Action issued in U.S. Appl. No. 17/257,260, dated Jul. 6, 2022 (12 pgs).
U.S. Appl. No. 17/296,466, filed May 24, 2021, Inoue et al.
U.S. Appl. No. 17/420,660, filed Jul. 2, 2021, Suzuki et al.
U.S. Appl. No. 17/428,909, filed Aug. 5, 2021, Tokunaga et al.
U.S. Appl. No. 17/429,986, filed Aug. 10, 2021, Suzuki et al.
U.S. Appl. No. 17/603,561, filed Oct. 13, 2021, Imura et al.
Definition of groove by Merriam Webster.
Chinese Office Action issued in application No. 201380070532.6 (with translation), dated Jan. 28, 2016 (13 pgs).
Chinese Office Action issued in application No. 201380070532.6 (with translation), dated Sep. 20, 2016 (12 pgs).
Second Office Action issued by the State Intellectual Property Office of China, dated Aug. 29, 2016, for Chinese counterpart application No. 201480002574.0, 8 pages.
First Notification of Reason for Refusal issued by the State Intellectual Property Office of China, dated Dec. 24, 2015, with a search report for Chinese counterpart application No. 201480002574.0, 11 pages.
Office Action issued in U.S. Appl. No. 14/431,733, dated Apr. 29, 2016 (22 pgs).
Office Action issued in U.S. Appl. No. 14/431,733, dated Aug. 18, 2017 (13 pgs).
Office Action issued in U.S. Appl. No. 14/431,733, dated Mar. 31, 2017 (14 pgs).
Office Action issued in U.S. Appl. No. 14/431,733, dated Oct. 6, 2016 (12 pgs).
Office Action issued in U.S. Appl. No. 15/419,989, dated Jan. 26, 2018 (20 pgs).
Office Action issued in U.S. Appl. No. 15/419,970, dated May 11, 2018 (17 pgs).
Office Action issued in U.S. Appl. No. 15/419,970, dated Jan. 23, 2018 (21 pgs).
Office Action issued in U.S. Appl. No. 15/842,862, dated Jun. 5, 2019 (37 pgs).
Office Action issued in U.S. Appl. No. 15/842,855, dated Mar. 12, 2020 (11 pgs).
Office Action issued in U.S. Appl. No. 15/842,855, dated Jun. 29, 2020, 16 pages.
Office Action issued in U.S. Appl. No. 15/842,858, dated Mar. 31, 2020 (10 pgs).
Office Action issued in U.S. Appl. No. 15/842,859, dated Apr. 8, 2020 (12 pgs).
Notice of Allowance issued in U.S. Appl. No. 15/419,970, dated Aug. 9, 2018 (16 pgs).
Notice of Allowance issued in U.S. Appl. No. 14/431,733, dated Feb. 23, 2018 (22 pgs).
Notice of Allowance issued in U.S. Appl. No. 15/419,989, dated Jul. 23, 2018 (11 pgs).
Notice of Allowance issued in U.S. Appl. No. 15/842,862, dated Sep. 30, 2019, 15 pages.
Japanese Office Action (w/translation) issued in application 2018-159877, dated Jun. 13, 2019 (7 pgs).
International Search Report issued in application No. PCT/JP2013/084029, dated Mar. 25, 2014 (4 pgs).
International Preliminary Report on Patentability issued in application No. PCT/JP2013/084029, dated Nov. 5, 2015 (8 pgs).
International Search Report and Written Opinion issued in PCT/JP2014/050402, dated Feb. 10, 2014, with English translation, 12 pages.
International Preliminary Report on Patentability issued in PCT/JP2014/050402, dated Jul. 21, 2015, 4 pages.
International Search Report and Written Opinion issued in PCT/JP2019/045728, dated Dec. 17, 2019, with English translation, 13 pages.
International Preliminary Report on Patentability issued in PCT/JP2019/045728, dated May 25, 2021, 7 pages.

(56) References Cited

OTHER PUBLICATIONS

International Search Report and Written Opinion issued in PCT/JP2019/047890, dated Feb. 10, 2020, with English translation, 13 pages.
International Preliminary Report on Patentability issued in PCT/JP2019/047890, dated Aug. 10, 2021, 7 pages.
International Search Report and Written Opinion issued in PCT/JP2019/049870, dated Mar. 10, 2020, with English translation, 13 pages.
International Preliminary Report on Patentability issued in PCT/JP2019/049870, dated Jun. 16, 2021, 7 pages.
International Search Report and Written Opinion issued in PCT/JP2020/005260, dated Apr. 7, 2020, with English translation, 16 pages.
International Preliminary Report on Patentability issued in PCT/JP2020/005260, dated Aug. 10, 2021, 9 pages.
International Search Report and Written Opinion issued in PCT/JP2020/006421, dated Apr. 21, 2020, with English translation, 13 pages.
International Preliminary Report on Patentability issued in PCT/JP2020/006421, dated Aug. 10, 2021, 6 pages.
International Search Report and Written Opinion issued in PCT/JP2020/017170, dated Jun. 2, 2020, with English translation, 13 pages.
European Official Action issued in related European Patent Application Serial No. 19850900.2, dated Mar. 31, 2022, 11 pages.
European Official Action issued in related European Patent Application Serial No. 19843273.4, dated Mar. 24, 2022, 9 pages.
Chinese Office Action issued in application No. 201980065303.2 (with translation), dated Oct. 10, 2022 (13 pgs).
European Official Action issued in related European Patent Application Serial No. 19914452.8, dated Oct. 5, 2022, 10 pages.
European Official Action issued in related European Patent Application Serial No. 20756664.7, dated Oct. 14, 2022, 8 pages.
European Official Action issued in related European Patent Application Serial No. 20759684.2, dated Oct. 17, 2022, 7 pages.
Korean Office Action issued in application No. 10-2021-7019130 (with translation), dated Oct. 22, 2022 (13 pgs).
Korean Office Action issued in application No. 10-2021-7007194 (with translation), dated Nov. 7, 2022 (14 pgs).
Korean Office Action issued in application No. 10-2021-7009776 (with translation), dated Dec. 12, 2022 (19 pgs).
Notice of Allowance issued in U.S. Appl. No. 17/257,260, dated Nov. 23, 2022, 9 pages.
U.S. Appl. No. 17/257,260, filed Dec. 30, 2020, Okada.
U.S. Appl. No. 17/259,336, filed Jan. 11, 2021, Imura.
U.S. Appl. No. 17/275,505, filed Mar. 11, 2021, Tokunaga et al.
U.S. Appl. No. 17/277,282, filed Mar. 17, 2021, Tokunaga.
U.S. Appl. No. 17/429,896, filed Aug. 10, 2021, Suzuki et al.
U.S. Appl. No. 17/628,158, filed Jan. 18, 2022, Inoue et al.
International Preliminary Report on Patentability issued in PCT/JP2020/027005, dated Feb. 1, 2022, 4 pages.
International Search Report and Written Opinion issued in PCT/JP2020/027005, dated Sep. 1, 2020, with English translation, 11 pages.
International Preliminary Report on Patentability issued in PCT/JP2019/032723, dated Mar. 2, 2021, 6 pages.
International Search Report and Written Opinion issued in PCT/JP2019/032723, dated Nov. 5, 2019, with English translation, 17 pages.
International Preliminary Report on Patentability issued in PCT/JP2019/029771, dated Feb. 2, 2021, 7 pages.
International Search Report and Written Opinion issued in PCT/JP2019/029771, dated Sep. 17, 2019, with English translation, 20 pages.
International Preliminary Report on Patentability issued in PCT/JP2019/040209, dated Apr. 27, 2021, 6 pages.
International Search Report and Written Opinion issued in PCT/JP2019/040209, dated Dec. 24, 2019, with English translation, 17 pages.
International Preliminary Report on Patentability issued in PCT/JP2019/038155, dated. Mar. 23, 2021, 6 pages.
International Search Report and Written Opinion issued in PCT/JP2019/038155, dated Nov. 19, 2019, with English translation, 18 pages.
Chinese Office Action issued in application No. 201980076998.4 (with translation), dated Jan. 18, 2023, 12 pages.
Chinese Office Action issued in application No. 201980059152.X (with translation), dated Oct. 10, 2022, 14 pages.
Chinese Office Action issued in application No. 201980059152.X (with translation), dated May 8, 2023, 11 pages.
Chinese Office Action issued in application No. 202080012994.2(with translation), dated Feb. 2, 2023, 13 pages.
Chinese Office Action issued in application No. 202080012994.2(with translation), dated Apr. 24, 2023, 12 pages.
Chinese Office Action issued in application No. 201980082245.4 (with translation), dated Feb. 16, 2023, 23 pages.
European Official Action issued in application No. 19869466.3, dated Mar. 16, 2023, 7 pages.
European Official Action issued in application No. 22212136.0, dated Mar. 15, 2023, 8 pages.
European Official Action issued in application No. 19850900.2, dated Mar. 28, 2023, 4 pages.
European Official Action issued in application No. 23155551.7, dated Feb. 28, 2023, 7 pages.
European Official Action issued in application No. 19888532.9, dated Mar. 7, 2023, 3 pages.
European Official Action issued in application No. 23158438.4, dated May 15, 2023, 11 pages.
European Search Report issued in application No. 20847261.3, dated Jul. 17, 2023, 8 pages.
Japanese Decision of Refusal issued in application No. 2021-502065, dated May 23, 2023, 8 pages.
Korean Official Action issued in Korean Patent Application Serial No. 10-2021-7002193, dated Jan. 11, 2023, 11 pages.
Korean Official Action issued in Korean Patent Application Serial No. 10-2021-7022185, dated Apr. 6, 2023, 12 pages.
Korean Official Action issued in Korean Patent Application Serial No. 10-2021-7016898, dated Feb. 16, 2023, 13 pages.
Korean Official Action issued in Korean Patent Application Serial No. 10-2021-7028879, dated Jun. 28, 2023, 10 pages.
Official Action issued in related U.S. Appl. No. 17/296,466, dated Apr. 12, 2023, 9 pages.
Official Action issued in related U.S. Appl. No. 17/428,909, dated Apr. 21, 2023, 8 pages.
Official Action issued in related U.S. Appl. No. 17/428,909, dated Jul. 25, 2023, 8 pages.
Official Action issued in related U.S. Appl. No. 17/628,158, dated May 15, 2023, 14 pages.
Notice of Allowance issued in related U.S. Appl. No. 17/296,466, dated Jul. 24, 2023, 9 pages.

* cited by examiner (a)

(b)

SLIDING COMPONENT

TECHNICAL FIELD

The present invention relates to relatively rotating sliding components, for example, sliding components used in a shaft sealing device axially sealing a rotation shaft of a rotating machine in an automobile, a general industrial machine, or other sealing fields or sliding components used in a bearing of a rotating machine in an automobile, a general industrial machine, or other bearing fields.

BACKGROUND ART

Conventionally, as a shaft sealing device that axially seals a rotation shaft of a rotating machine such as a pump or a turbine and prevents a leakage of a sealed fluid, there is known one, for example, a mechanical seal including two components rotating relative to each other and configured so that planar end surfaces slide on each other. The mechanical seal includes a stationary seal ring which is a sliding component fixed to a housing and a rotating seal ring which is a sliding component fixed to a rotation shaft and rotating together with the rotation shaft and a gap between the housing and the rotation shaft is axially sealed by relatively rotating their sliding surfaces.

In order to maintain the sealability for a long period of time, such a mechanical seal needs to achieve the functions of "sealing" and "lubrication" at the same time. In particular, in recent years, there has been an increasing demand for lower friction in order to reduce mechanical loss while preventing leakage of the sealed fluid for environmental measures.

For example, as a method for lowering friction, there is a method in which a plurality of dynamic pressure generating grooves are formed in a sliding surface as in Patent Citation 1. In the plurality of dynamic pressure generating grooves, one end which is a start point opens to one radial edge of the rotating seal ring and a front end portion on the other end side is located in the sliding surface. Accordingly, a fluid (here, a sealed fluid) is drawn into the dynamic pressure generating groove from one end corresponding to the start point of the dynamic pressure generating groove due to the relative rotation between two sliding components so that a dynamic pressure is generated at the front end portion. In such a way, since a so-called fluid lubrication state is exhibited in which a sliding action is performed while a fluid film is interposed between the sliding surfaces, it is possible to lower the friction between the sliding components. Additionally, since the dynamic pressure generating groove has a shape in which the front end portion on the other end side does not open to the other radial edge of the rotating seal ring, the leakage of the sealed fluid is prevented.

CITATION LIST

Patent Literature

Patent Citation 1: JP H8-89489 A (Page 3, FIG. 4)

SUMMARY OF INVENTION

Technical Problem

In such a sliding component, it is necessary to form a large number of dynamic pressure generating grooves in order to sufficiently draw the sealed fluid. Since the dynamic pressure generating grooves of Patent Citation 1 are evenly arranged in the circumferential direction of the sliding surface, a dynamic pressure can be generated between the sliding surfaces by uniformly drawing the sealed fluid in the circumferential direction. Also, since land portions are scattered between the dynamic pressure generating grooves in the circumferential direction of the sliding surface, each land portion cannot be formed in a size capable of sufficiently holding a fluid film. As a result, since the shape and thickness of the fluid film are not stabilized, there is concern that the fluid lubrication state cannot be sufficiently exhibited and maintained.

The present invention has been made in view of such problems and an object of the present invention is to provide a sliding component capable of securing a groove unprocessed section having a size capable of stably holding a fluid film while sufficiently securing lubricity of a sliding surface.

Solution to Problem

In order to solve the foregoing problems, a sliding component according to the present invention is a sliding component formed into an annular shape and disposed at a relatively rotating position of a rotating machine, wherein a sliding surface of the sliding component has a first radial edge and a second radial edge opposed to the first radial edge in a radial direction and is provided with a plurality of dynamic pressure generating groove groups arranged in a circumferential direction, each of the dynamic pressure generating groove groups including a plurality of dynamic pressure generating grooves having a start point opening at the first radial edge of the sliding surface and an end point closing within the sliding surface while extending circumferentially, and wherein the dynamic pressure generating groove provided between the dynamic pressure generating grooves located at both ends of each of the dynamic pressure generating groove groups is formed to be longer than the dynamic pressure generating grooves located at the both ends of each of the dynamic pressure generating groove groups in the circumferential direction. According to the foregoing feature of the present invention, since the plurality of dynamic pressure generating grooves are grouped as the dynamic pressure generating groove group and the dynamic pressure generating groove provided between the dynamic pressure generating grooves located at both ends of these, that is, the dynamic pressure generating groove at the center part is formed to be longer than the dynamic pressure generating grooves located at both ends of the dynamic pressure generating groove group in the circumferential direction, the dynamic pressure generating grooves are unevenly distributed in the circumferential direction and a groove unprocessed section can be secured between the dynamic pressure generating groove groups while sufficiently securing the number of the dynamic pressure generating grooves. In addition, since the dynamic pressure generating groove which is long in the circumferential direction at the center part can deeply draw the fluid, it is possible to lubricate the sliding surfaces while supplying the fluid between the sliding surfaces by sufficiently generating a dynamic pressure in the sliding surfaces even when the dynamic pressure generating groove at the side part is short in the circumferential direction. Therefore, since it is possible to sufficiently separate the dynamic pressure generating grooves of the adjacent dynamic pressure generating groove groups at the side part while securing the lubricity required for the sliding surface, it is possible to secure a groove unprocessed section having a size capable of stably holding a fluid film between the dynamic pressure generating groove groups.

It may be preferable that the plurality of dynamic pressure generating grooves curvedly extend to form into a spiral around a center of the sliding surface. According to this preferable configuration, the circumferential length of the dynamic pressure generating groove can be sufficiently secured.

It may be preferable that the dynamic pressure generating groove provided between the dynamic pressure generating grooves located at the both ends of each of the dynamic pressure generating groove groups extends so as to approach the second radial edge of the sliding surface more than the dynamic pressure generating grooves located at both ends extend. According to this preferable configuration, since the dynamic pressure generating groove provided between the dynamic pressure generating grooves located at both ends can deeply draw a fluid in the radial direction, it is possible to sufficiently lubricate the sliding surface over the radial direction while securing the groove unprocessed section having a size capable of stably holding a fluid film by shortening the dynamic pressure generating grooves located at both ends in the radial direction.

It may be preferable that a land portion of the sliding surface formed between and radially inward or outward the dynamic pressure generating groove groups are flush with groove-unprocessed sections of the sliding surface between the dynamic pressure generating grooves included in each of the dynamic pressure generating groove groups. According to this preferable configuration, since it is possible to prevent the fluid drawn into the dynamic pressure generating groove at the center part from leaking to one edge side of the sliding surface in the radial direction along the dynamic pressure generating groove at the side part, it is possible to effectively generate a dynamic pressure at the end point side of the dynamic pressure generating groove at the center part.

It may be preferable that the dynamic pressure generating grooves of each of the dynamic pressure generating groove groups are divided into a center part and two side parts sandwiching the center part therebetween in the circumferential direction, and the end points of the dynamic pressure generating grooves of the side parts are continuously separated from the end points of the dynamic pressure generating grooves of the center part in the radial direction and becomes gradually shorter as it goes away from the dynamic pressure generating grooves of the center part. According to this preferable configuration, since the end points of the dynamic pressure generating groove group form a gentle mountain shape with the dynamic pressure generating groove located at the center part as the apex, it is possible to secure a large land portion continuous to the other radial edge side from the dynamic pressure generating groove located at the side part of the dynamic pressure generating groove group.

It may be preferable that the end points of the dynamic pressure generating grooves of each of the dynamic pressure generating groove groups are unevenly distributed to one side of the dynamic pressure generating groove group in the circumferential direction. According to this preferable configuration, since the end points of the dynamic pressure generating grooves are unevenly distributed to one side of the dynamic pressure generating groove group in the circumferential direction, it is possible to secure a large groove unprocessed section at one side of the dynamic pressure generating groove group in the circumferential direction and to efficiently supply a fluid to the groove unprocessed section.

It may be preferable that the dynamic pressure generating groove groups are disposed point-symmetrically with the center of the sliding surface as a symmetric point. According to this preferable configuration, it is possible to stably hold a fluid film in the groove unprocessed section by uniformly generating a dynamic pressure in the circumferential direction of the sliding surface.

It may be preferable that the dynamic pressure generating grooves of the center part of each of the dynamic pressure generating groove groups is formed so that the start points thereof are deeper than that of the dynamic pressure generating grooves of the side parts. According to this preferable configuration, it is possible to reliably generate a dynamic pressure at the end point by sufficiently drawing a lubricating fluid to the long dynamic pressure generating groove at the center part.

It may be preferable that each of the plurality of dynamic pressure generating grooves are formed so that a depth thereof gradually becomes shallower from the start point toward the end point. According to this preferable configuration, it is possible to handle a wide range of rotation speeds and improve robustness by changing the depth of the dynamic pressure generating groove.

DESCRIPTION OF EMBODIMENTS

Modes for carrying out a sliding component according to the present invention will be described below on the basis of embodiments.

First Embodiment

A sliding component according to a first embodiment will be described with reference to FIGS. 1 to 3.

The sliding components of the embodiment are, for example, a rotating seal ring 3 and a stationary seal ring 6 that constitute a mechanical seal which is a shaft sealing device for axially sealing a rotation shaft of a rotating machine in an automobile, a general industrial machine, or other sealing fields.

Figure 1:
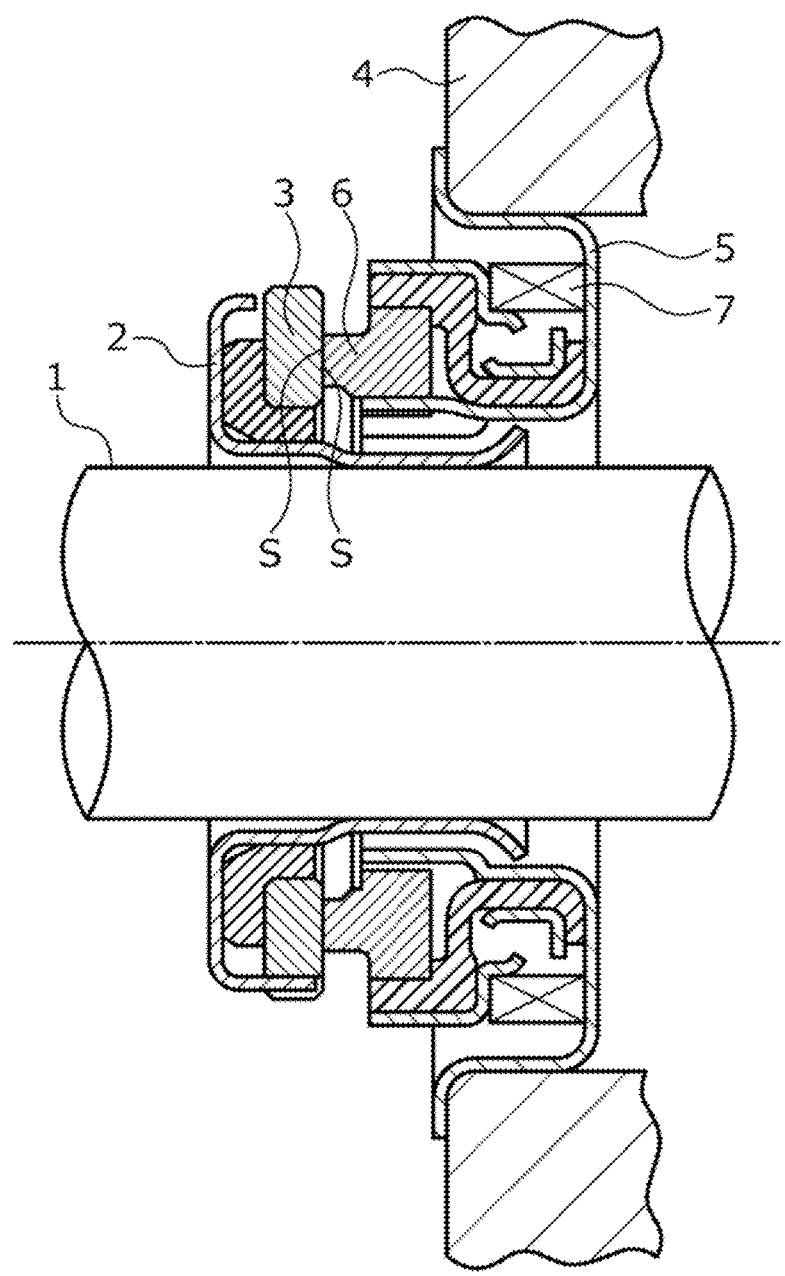
FIG. 1 is a cross-sectional view illustrating a structure of a rotating machine that uses a mechanical seal having a sliding component according to a first embodiment of the present invention.

As illustrated in FIG. 1, the mechanical seal is of an inside type that seals a sealed fluid that is about to leak from the outer periphery of the sliding surface toward the inner periphery thereof and the annular rotating seal ring 3 which is provided on the side of the rotation shaft 1 so as to be rotatable together with the rotation shaft 1 through a sleeve 2 and the annular stationary seal ring 6 which is provided in a seal cover 5 fixed to a housing 4 of the rotating machine so as not to be rotatable and to be movable in the axial direction are formed so that sliding surfaces S slide on each other in a close contact state due to an urging means 7 axially urging the stationary seal ring 6. That is, this mechanical seal is to prevent the sealed fluid on the outer periphery of the sliding surface S from leaking to the inner peripheral side in the mutual sliding surfaces S of the rotating seal ring 3 and the stationary seal ring 6. In the embodiment, the sealed fluid is a gas such as air or dry gas.

The rotating seal ring 3 and the stationary seal ring 6 are typically formed of SiC (as an example of hard material) or a combination of SiC (as an example of hard material) and carbon (as an example of soft material), but a sliding material can be a sliding material used for a mechanical seal. As SiC, there are materials composed of two or more types of phases with different components and compositions, for example, SiC formed by dispersing graphite particles, reaction sintered SiC composed of SiC and Si, SiC—TiC, SiC—TiN, and the like, including sintered bodies using boron, aluminum, carbon, or the like as sintering aids. As carbon, carbon that is a mixture of carbon and graphite, resin molded carbon, sintered carbon, and the like can be used. Further, in addition to the sliding material, metal materials, resin materials, surface modification materials (e.g., coating materials), composite materials, and the like can also be applied.

Figure 2:
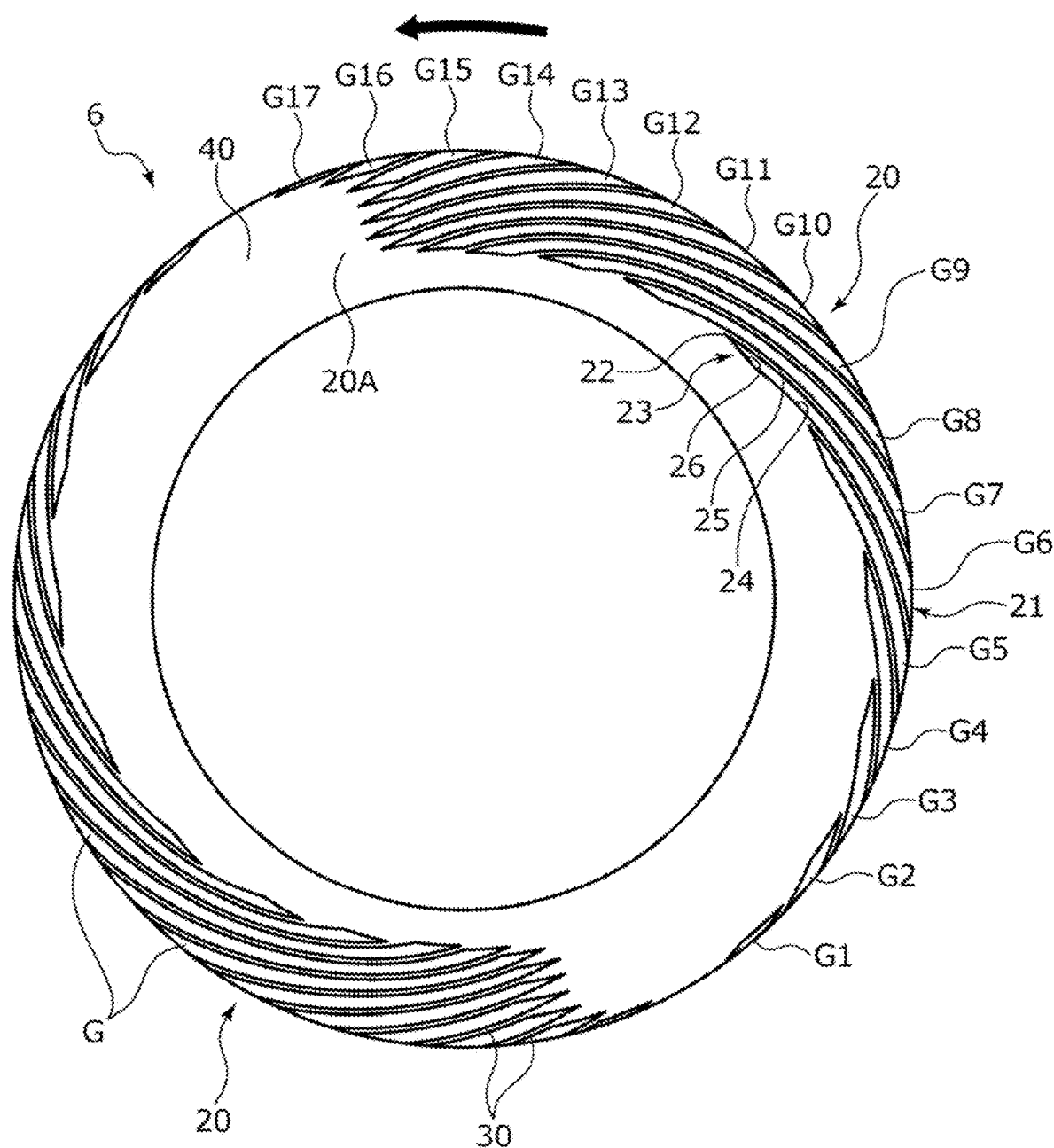
FIG. 2 is a diagram in which a stationary seal ring of the mechanical seal is viewed from a sliding surface side in the first embodiment.
Figure 3:
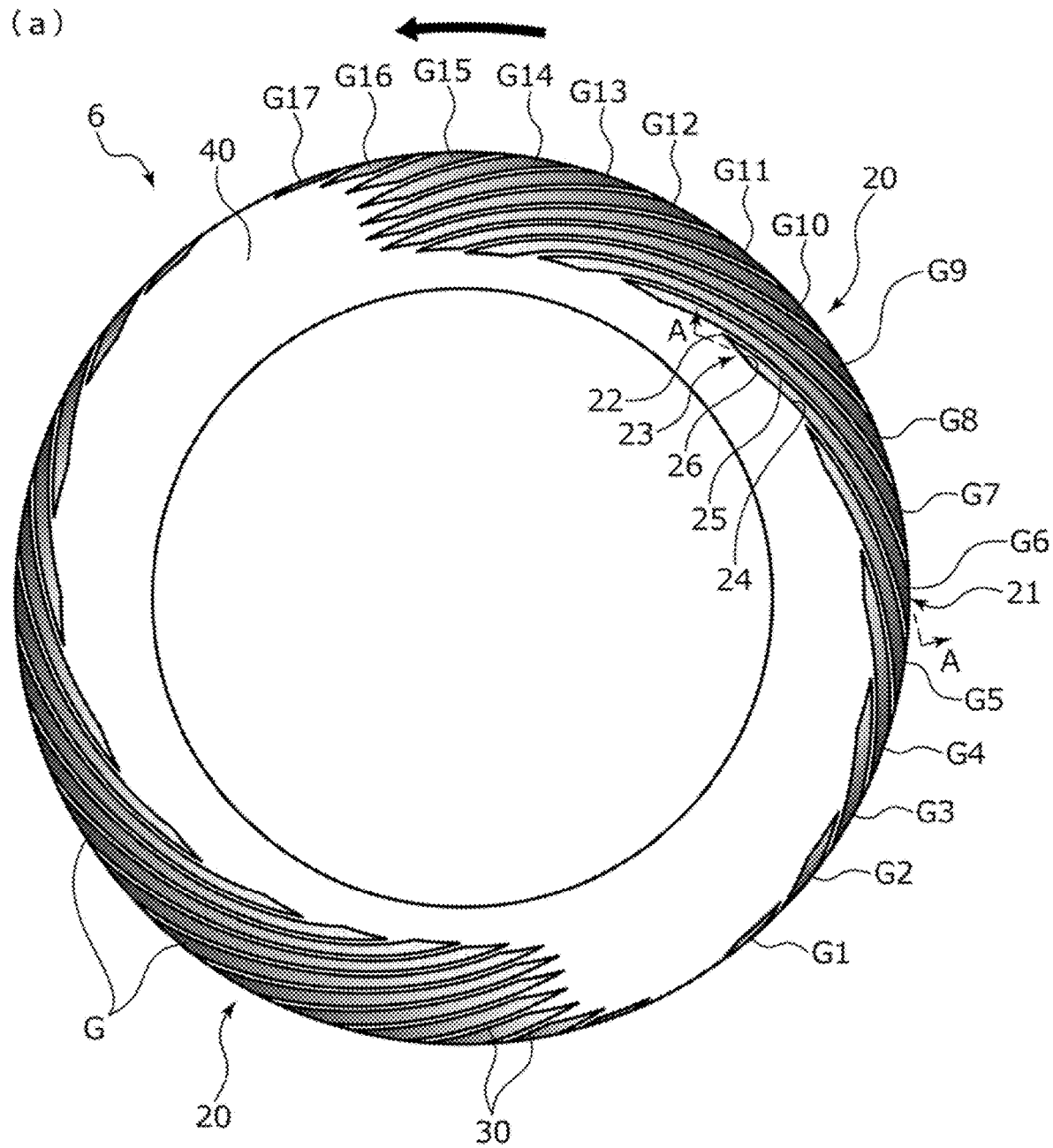
FIG. 3 is a diagram in which a depth of a dynamic pressure generating groove in the sliding surface of the stationary seal ring is expressed by a shade of color in the first embodiment.
Figure 3:
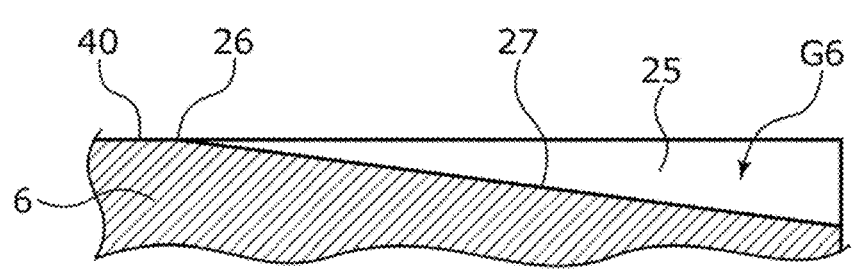

As illustrated in FIG. 2, a plurality of dynamic pressure generating grooves G which are disposed in the circumferential direction and are separated from each other in the circumferential direction are formed on the sliding surface S of the stationary seal ring 6. A total of thirty four dynamic pressure generating grooves G are formed in the circumferential direction, a predetermined number of (here, seventeen) dynamic pressure generating grooves are formed at the same separation width in the circumferential direction, and two dynamic pressure generating groove groups 20 including seventeen dynamic pressure generating grooves are point-symmetrically provided in the circumferential direction at a predetermined separation width. The dynamic pressure generating groove group 20 means a group of the dynamic pressure generating grooves formed in the same pattern in the sliding surface S in the circumferential direction.

Next, the dynamic pressure generating groove G will be described by exemplifying a sixth dynamic pressure generating groove G6 from the rear end among seventeen dynamic pressure generating grooves G constituting the dynamic pressure generating groove group 20. The dynamic pressure generating groove G opens to the outer peripheral edge side and includes a start point 21 which opens to the outer peripheral edge and an end point 22 which closes inside the sliding surface S while extending in the circumferential direction and the inner radial direction. Specifically, the dynamic pressure generating groove G has a curved shape which includes a component extending in the circumferential direction and a component extending in the radial direction and the component extending in the circumferential direction is formed to be larger the other one among them. The dynamic pressure generating groove G can be formed by subjecting the mirror-processed sliding surface S to fine processing such as laser processing or sandblasting.

The dynamic pressure generating groove G6 is formed in a curved shape which protrudes toward the outer peripheral edge side of the sliding surface S. Additionally, the dynamic pressure generating grooves G in one dynamic pressure generating groove group 20 are formed to have the same curvature along a virtual circumference having the same center of curvature. Further, the dynamic pressure generating groove G6 is formed to have substantially the same width so that a side wall 24 and a side wall 25 constituting the dynamic pressure generating groove G6 are at equal intervals except for a front end portion 23 on the side of the end point 22, a boundary 26 intersecting the side wall 24 and the side wall 25 on the side of the end point 22 is disposed in the circumferential direction so that the front end portion 23 is formed, and the front end portion 23 is formed at an acute angle so that the width is gradually narrowed toward the end point 22 in the sliding direction. Additionally, the boundary 26 constituting the front end portion 23 may be a wall having a depth and a boundary line with a land portion 40 to be described later in accordance with the depth set for each dynamic pressure generating groove G.

Further, two dynamic pressure generating groove groups 20 are evenly and point-symmetrically arranged with the midpoint of the sliding surface S as a symmetric point. The dynamic pressure generating groove group 20 includes seventeen dynamic pressure generating grooves G1 to G17 which are arranged at equal intervals in the circumferential direction. Further, in the dynamic pressure generating grooves G constituting the dynamic pressure generating groove group 20, the dynamic pressure generating groove G located at the center part of the dynamic pressure generating groove group 20 is formed to be longer than the dynamic pressure generating groove G located at the side part in the circumferential direction. For example, the dynamic pressure generating grooves G8 to G10 located at the center part are formed to be longer than the dynamic pressure generating grooves G1 to G7 and G11 to G17 located at the side part. In the embodiment, the ninth dynamic pressure generating groove G9 from the rear end located at the center part of the dynamic pressure generating groove group 20 is formed to be the longest in the circumferential direction.

The gap between two dynamic pressure generating groove groups 20 and the inner radial side of the dynamic pressure generating groove group 20 are formed as the land portion 40 which forms a flat surface without the dynamic pressure generating groove G. Further, the gap between the dynamic pressure generating grooves G also have a small width in the circumferential direction or the radial direction, but is formed as a land portion 30 which forms a flat surface without the dynamic pressure generating groove G. Further, the land portion 30 and the land portion 40 are flush with each other.

Further, the dynamic pressure generating grooves G8 to G10 located at the center part are formed to be longer on the inner peripheral edge side in the radial direction than the dynamic pressure generating grooves G1 to G7 and G11 to G17 located at the side part. Specifically, the end points 22 of the dynamic pressure generating grooves G1 to G7 and G11 to G17 located at the side part of the dynamic pressure generating groove group 20 are formed so that the radial positions continuously move away from the end points 22 of the dynamic pressure generating grooves G8 to G10 located at the center part, that is, the radial depth becomes shallower and the circumferential length thereof is gradually shortened as it goes away from the dynamic pressure generating grooves G8 to G10 located at the center part. The dynamic pressure generating grooves G8 to G10 located at the center part are formed from the start point 21 to the end point 22 over 45° or more in the circumferential direction of the sliding surface S. Particularly, in order to reliably generate a dynamic pressure, it is preferable that the longest dynamic pressure generating groove G in the longitudinal direction is formed from the start point 21 to the end point 22 over 45° or more in the circumferential direction of the sliding surface S.

Further, the end points 22 of the dynamic pressure generating grooves G constituting the dynamic pressure generating groove group 20 are unevenly distributed to the front end side 20A of the dynamic pressure generating groove group 20. Specifically, the end point of the longest dynamic pressure generating groove G9 in the circumferential direction is located on the front end side 20A when the overall shape of the dynamic pressure generating groove group 20 is captured, that is, the same side as the rotation direction of the rotating seal ring 3 in the dynamic pressure generating groove group 20 and the dynamic pressure generating grooves G10 to G17 located on the front end side in relation to the dynamic pressure generating groove G9 exist so that the end points are close to each other on the radius of the sliding surface S. In contrast, the end points of the dynamic pressure generating grooves G1 to G8 located at the rear end side in relation to the dynamic pressure generating groove G9 are scattered in a long range of the sliding surface S in the circumferential direction. In this way, the dynamic pressure generating groove group 20 including the dynamic pressure generating grooves G is formed in a shape in which the front end side 20A is disposed in a wide radial area and is disposed in a narrower radial area toward the rear end side 20B and the rear end side 20B is biased toward the outer radial side based on the circumferential direction, that is, a so-called comma character shape. Additionally, in the first embodiment, there is a relationship in which the circumferential length of each dynamic pressure generating groove G of the dynamic pressure generating groove group 20 is proportional to the longitudinal length of each dynamic pressure generating groove G.

Further, as illustrated in FIGS. 3A and 3B, the depth of the dynamic pressure generating groove G is formed to be gradually shallower from the start point 21 toward the end point 22. In FIG. 3A, the depth is expressed by the shade of color such that the dark part is deep and the light part is shallow. In the cross-sectional view of FIG. 3B, reference numeral 27 indicates the bottom surface of the dynamic pressure generating groove G.

Therefore, the space between the dynamic pressure generating groove G and the sliding surface of the rotating seal ring 3 facing the dynamic pressure generating groove becomes narrower as it goes toward the inside of the radial direction in the path of the sealed fluid drawn into the groove from the sealed fluid side so that the flow of the sealed fluid becomes narrower. Since the sealed fluid is gradually narrowed, a dynamic pressure is generated so that the rotating seal ring 3 and the stationary seal ring 6 are separated from each other. Accordingly, a fluid film is easily formed between the sliding surfaces S of the rotating seal ring 3 and the stationary seal ring 6 due to the sealed fluid, so that the sliding characteristics are improved.

Further, the dynamic pressure generating grooves G8 to G10 located at the center part of the dynamic pressure generating groove group 20 are formed so that the start points are deeper than the dynamic pressure generating grooves G1 to G7 and G11 to G17 located at the side part.

As described above, since the plurality of dynamic pressure generating grooves G are grouped as the dynamic pressure generating groove group 20 and are unevenly distributed in the circumferential direction, it is possible to secure the land portion 40 between the dynamic pressure generating groove groups 20 while securing a sufficient number of the dynamic pressure generating grooves G. In addition, since the dynamic pressure generating grooves G8 to G10 which are long in the circumferential direction at the center part can deeply draw a lubricating fluid, the sliding surface S can be sufficiently lubricated even when the dynamic pressure generating grooves G1 to G7 and G11 to G17 at the side part are shortened in the circumferential direction. Thus, since it is possible to sufficiently separate the dynamic pressure generating grooves G1 and G17 of the adjacent dynamic pressure generating groove groups 20 at the side part while securing the lubricity required for the sliding surface S, it is possible to secure a land portion having a size capable of stably holding a fluid film between the dynamic pressure generating groove groups 20.

Further, since the dynamic pressure generating groove G is formed in a curved shape, the dynamic pressure generating groove G can secure the overall length with respect to the circumferential length and effectively generate a dynamic pressure. Further, since the front end portion 23 of the dynamic pressure generating groove G is formed at an acute angle so that the width is gradually narrowed toward the end point 22 in the sliding direction, the space between the dynamic pressure generating groove G and the sliding surface of the rotating seal ring 3 facing the dynamic pressure generating groove becomes narrower toward the end point 22 and the flow of the sealed fluid is narrowed. Accordingly, a dynamic pressure is effectively generated.

In the dynamic pressure generating grooves G constituting the dynamic pressure generating groove group 20, the end points 22 of the dynamic pressure generating grooves G1 to G7 and G11 to G17 located at the side part of the dynamic pressure generating groove group 20 are formed so that the radial positions continuously move away from the end points 22 of the dynamic pressure generating grooves G8 to G10 located at the center part, that is, the radial depth becomes shallower and the circumferential length thereof is gradually shortened as it goes away from the dynamic pressure generating grooves G8 to G10 located at the center part. Accordingly, since the dynamic pressure generating grooves G8 to G10 at the center part can deeply draw the sealed fluid in the radial direction, the dynamic pressure generating grooves G1 to G7 and G11 to G17 at the side part are formed to be shallower than the dynamic pressure generating grooves G8 to G10 at the center part in the radial direction and the sliding surface S can be sufficiently lubricated in the radial direction while securing the land portion 40 having a size capable of stably holding a fluid film.

Further, the end points 22 of the dynamic pressure generating grooves G1 to G7 and G11 to G17 located at the side part of the dynamic pressure generating groove group 20 are formed so that the end points 22 of the dynamic pressure generating grooves G1 to G7 and G11 to G17 are continuously separated from the end points 22 of the dynamic pressure generating grooves G8 to G10 located at the center part in the radial direction as it goes away from the dynamic pressure generating grooves G8 to G10 located at the center part. Accordingly, since a curve connecting the end points 22 of the dynamic pressure generating groove group 20 forms a gentle mountain shape with the dynamic pressure generating grooves G8 to G10 located at the center part as the apex, the large continuous land portion 40 can be secured on the inner radial edge side of the dynamic pressure generating grooves G1 to G7 and G11 to G17 located at the side part of the dynamic pressure generating groove group 20. Additionally, the sine waveform of the curve connecting the end points 22 of the dynamic pressure generating groove group 20 is 14.2°.

Further, the dynamic pressure generating grooves G10 to G17 located at the front end side in relation to the dynamic pressure generating groove G9 exist so that the end points exist are close to each other on a line perpendicular to the center of the sliding surface S on the front end side of the dynamic pressure generating groove group 20 and the dynamic pressure generating grooves G1 to G8 located at the rear end side in relation to the dynamic pressure generating groove G9 exist so that the end points are scattered in a long range of the sliding surface S in the circumferential direction. Accordingly, the dynamic pressure generating groove group 20 has a so-called comma character shape having a rounded front end side and tapered toward the rear end side and hence the large land portion 40 can be secured between the dynamic pressure generating groove groups 20. In addition, since the end points of the dynamic pressure generating grooves G1 to G8 are unevenly distributed, a fluid can be efficiently supplied to the land portion 40.

Further, since the dynamic pressure generating grooves G8 to G10 located at the center part of the dynamic pressure generating groove group 20 are formed so that the start points are deeper than those of the dynamic pressure generating grooves G1 to G7 and G11 to G17 located at the side part, it is possible to reliably generate a dynamic pressure at the end point 22 by sufficiently drawing a lubricating fluid into the long dynamic pressure generating grooves G8 to G10 at the center part.

Further, the land portion 30 between the plurality of dynamic pressure generating grooves G constituting the dynamic pressure generating groove group 20 is flush with the land portion 40 connected between two dynamic pressure generating groove groups 20 and on the inner radial side of the dynamic pressure generating groove group 20. Accordingly, since it is possible to prevent a fluid drawn to the dynamic pressure generating grooves G8 to G10 at the center part from leaking to the inner radial edge side of the sliding surface S along the dynamic pressure generating grooves G1 to G7 and G11 to G17 at the side part, it is possible to effectively generate a dynamic pressure on the side of the end points 22 of the dynamic pressure generating grooves G8 to G10 at the center part. In addition, since the insides of the plurality of dynamic pressure generating grooves G can be made independent from the start point to the end point so as not to affect each other, it is possible to exhibit respective characteristics by setting different lengths or depths for the respective dynamic pressure generating grooves G and the positions of the end points 22 in the radial direction.

Further, in the dynamic pressure generating groove group 20, the dynamic pressure generating groove G9 which is the longest in the circumferential direction has the deepest start point and the shallowest end point and the dynamic pressure generating grooves G1 to G8 and G10 to G17 arranged with the apex of the dynamic pressure generating groove G9 interposed therebetween is formed so that the start point gradually becomes shallower and the end point becomes deeper. Accordingly, since the characteristics are different and gradually changed depending on the depths of the dynamic pressure generating grooves G1 to G17, it is possible to handle a wide range of rotation speeds of the rotating machine and improve robustness thereof.

Second Embodiment

Figure 4:
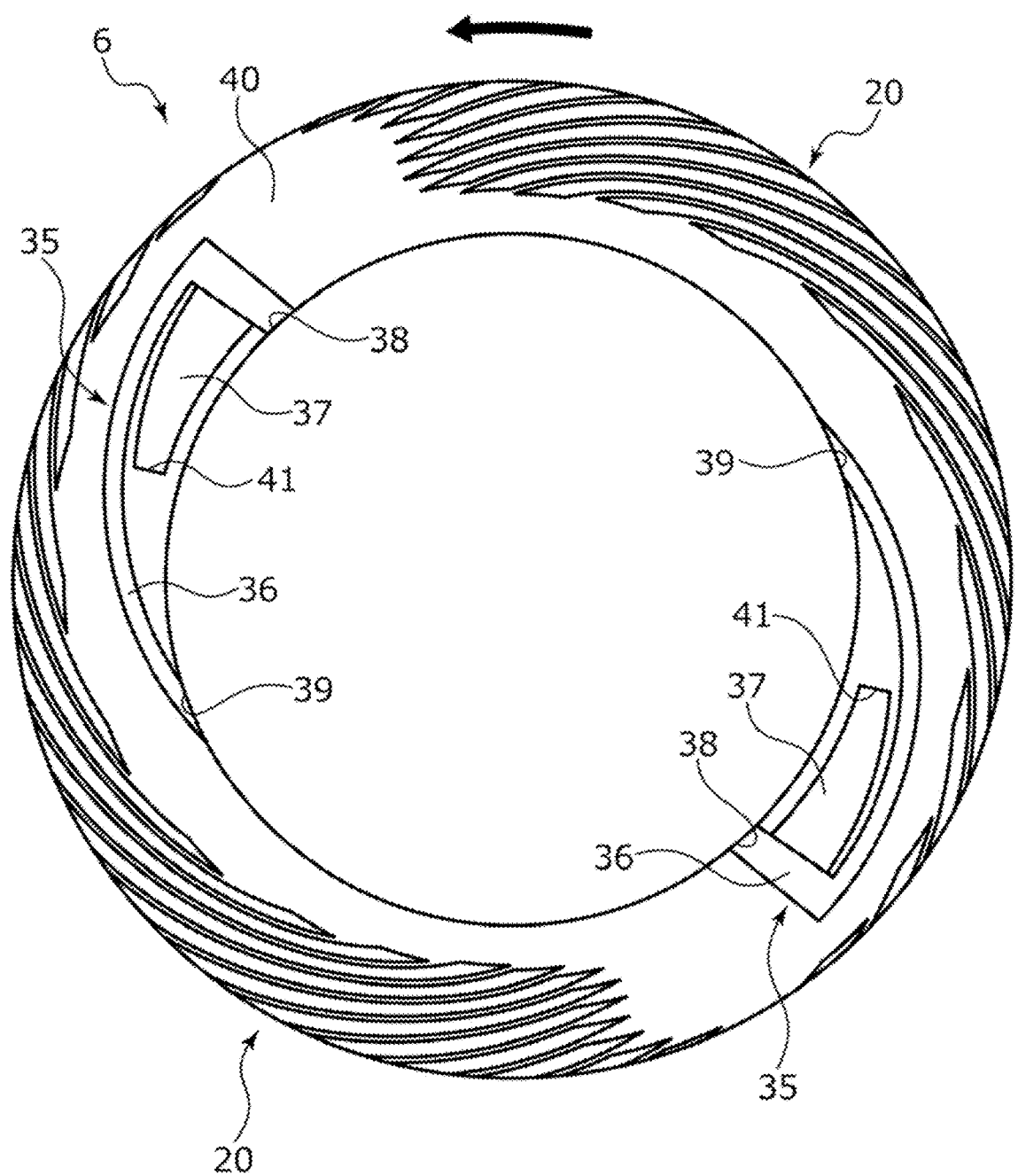
FIG. 4 is a diagram in which a stationary seal ring as a sliding component according to a second embodiment of the present invention is viewed from a sliding surface side.

Next, a mechanical seal according to a second embodiment will be described with reference to FIG. 4. In addition, the same components as those shown in the above-described embodiment are denoted by the same reference numerals and redundant description will be omitted.

A structure having a function of improving lubricity can be added to the land portion 40 which is connected between two dynamic pressure generating groove groups 20 and on the inner radial side of the dynamic pressure generating groove group 20. For example, as illustrated in FIG. 4, the other groove 35 may be added to a groove unprocessed section not provided with the dynamic pressure generating groove group 20 and the dynamic pressure generating groove group 20, that is, an area corresponding to the land portion 40 of the first embodiment.

Another groove 35 includes an auxiliary fluid circulating groove 36 in which a start point 38 and an end point 39 open together at an inner radial edge side and an auxiliary dynamic pressure generating groove 37 which communicates with the auxiliary fluid circulating groove 36 in a Rayleigh step. In the other groove 35, a sealed fluid such as a cooling fluid filled on the side of the inner peripheral edge side of the rotating seal ring 3 circulates such that the sealed fluid enters the auxiliary fluid circulating groove 36 from the start point 38 and is discharged from the end point 39 in accordance with the rotation of the rotating seal ring 3. Accordingly, a gap between the sliding surface S of the rotating seal ring 3 and the sliding surface of the stationary seal ring 6 is lubricated. Further, a part of the fluid entering the auxiliary fluid circulating groove 36 flows to the auxiliary dynamic pressure generating groove 37 so that a dynamic pressure is generated at the end point 41 of the auxiliary dynamic pressure generating groove 37.

In this way, since it is possible to secure a large groove unprocessed section connected between two dynamic pressure generating groove groups 20 and on the inner radial side of the dynamic pressure generating groove group 20, it is possible to add a structure for improving the lubricity between the sliding surface S of the rotating seal ring 3 and the sliding surface of the stationary seal ring 6 to the groove unprocessed section. Further, since the sealed fluid on the inner radial edge side of the rotating seal ring 3 circulates in the auxiliary fluid circulating groove 36, there is an effect of removing contamination between the sliding surface S of the rotating seal ring 3 and the sliding surface of the stationary seal ring 6.

As described above, the embodiments of the present invention have been described with reference to the drawings, but the specific configuration is not limited to these embodiments.

Figure 5:
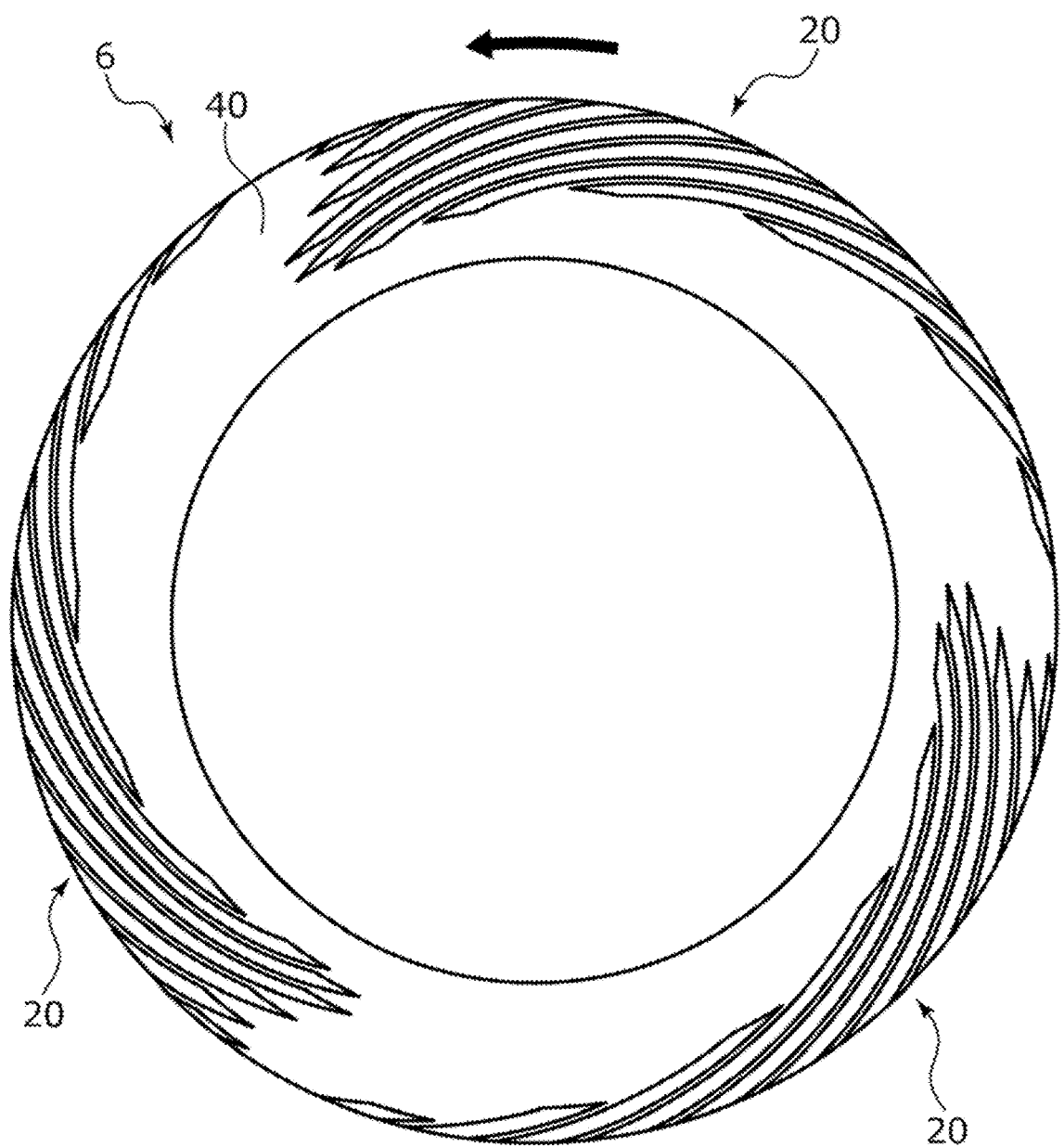
FIG. 5 is a diagram in which a stationary seal ring of a first modified example is viewed from a sliding surface side.
Figure 6:
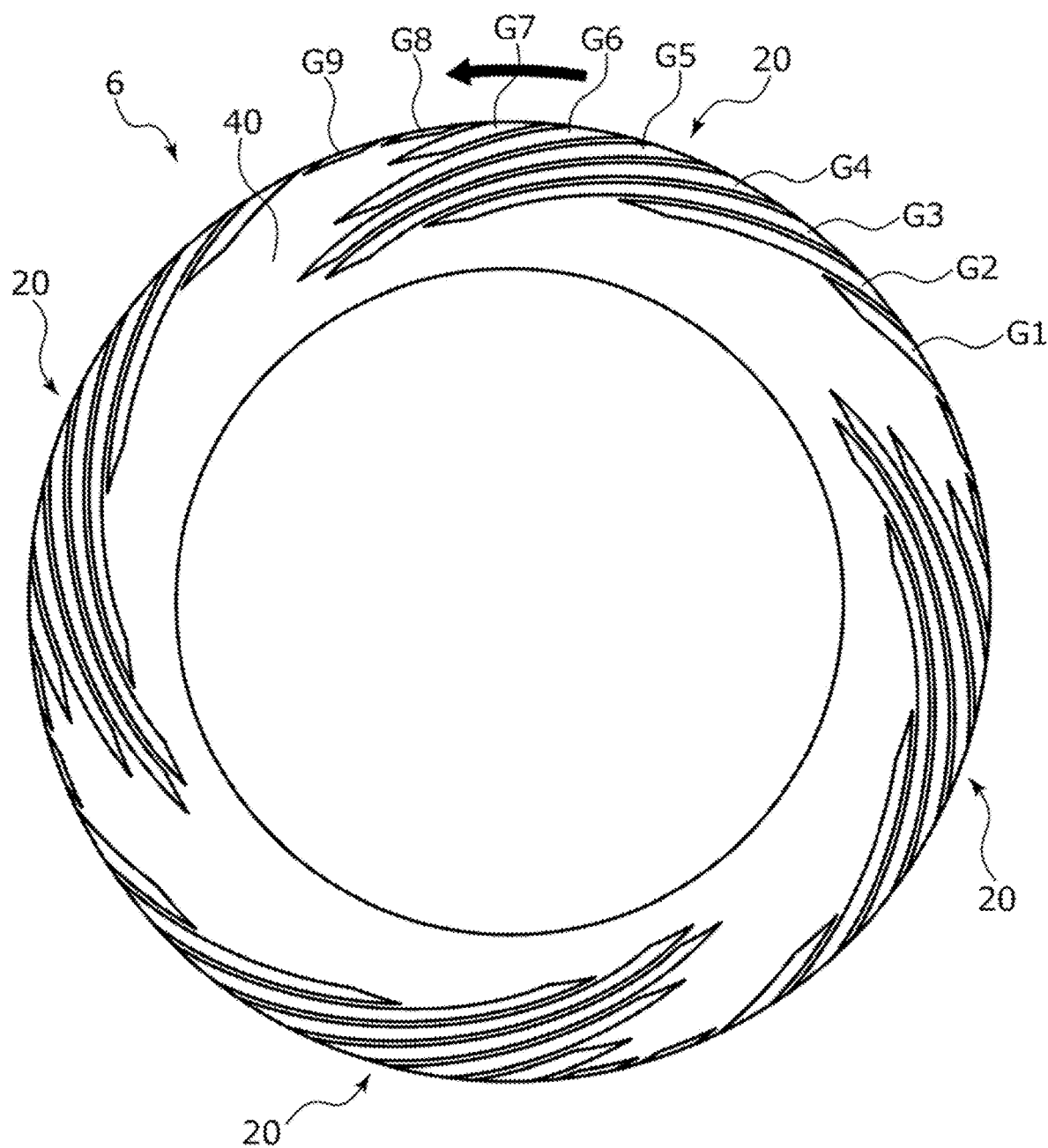
FIG. 6 is a diagram in which a stationary seal ring of a second modified example is viewed from a sliding surface side.

For example, in the above-described embodiments, two dynamic pressure generating groove groups 20 are point-symmetrically arranged in the sliding surface S, but the present invention is not limited thereto. For example, three dynamic pressure generating groove groups may be evenly arranged in the circumferential direction as in a first modified example of FIG. 5 or four dynamic pressure generating groove groups may be evenly arranged in the circumferential direction as in a second modified example of FIG. 6. Further, the number of the dynamic pressure generating grooves G constituting these dynamic pressure generating groove groups is arbitrary, is calculated by design, and is set to an optimum number. Additionally, in the dynamic pressure generating groove group 20, the circumferential separation width between the dynamic pressure generating grooves G (in FIGS. 6, G1 and G9) at both ends in the circumferential direction and the dynamic pressure generating grooves G at both ends of the adjacent dynamic pressure generating groove group 20 may be the same as the separation width between the dynamic pressure generating grooves G constituting the dynamic pressure generating groove group 20 and the separation width is not limited. That is, the dynamic pressure generating groove group 20 of FIG. 6 includes nine grooves G1 to G9.

Figure 7:
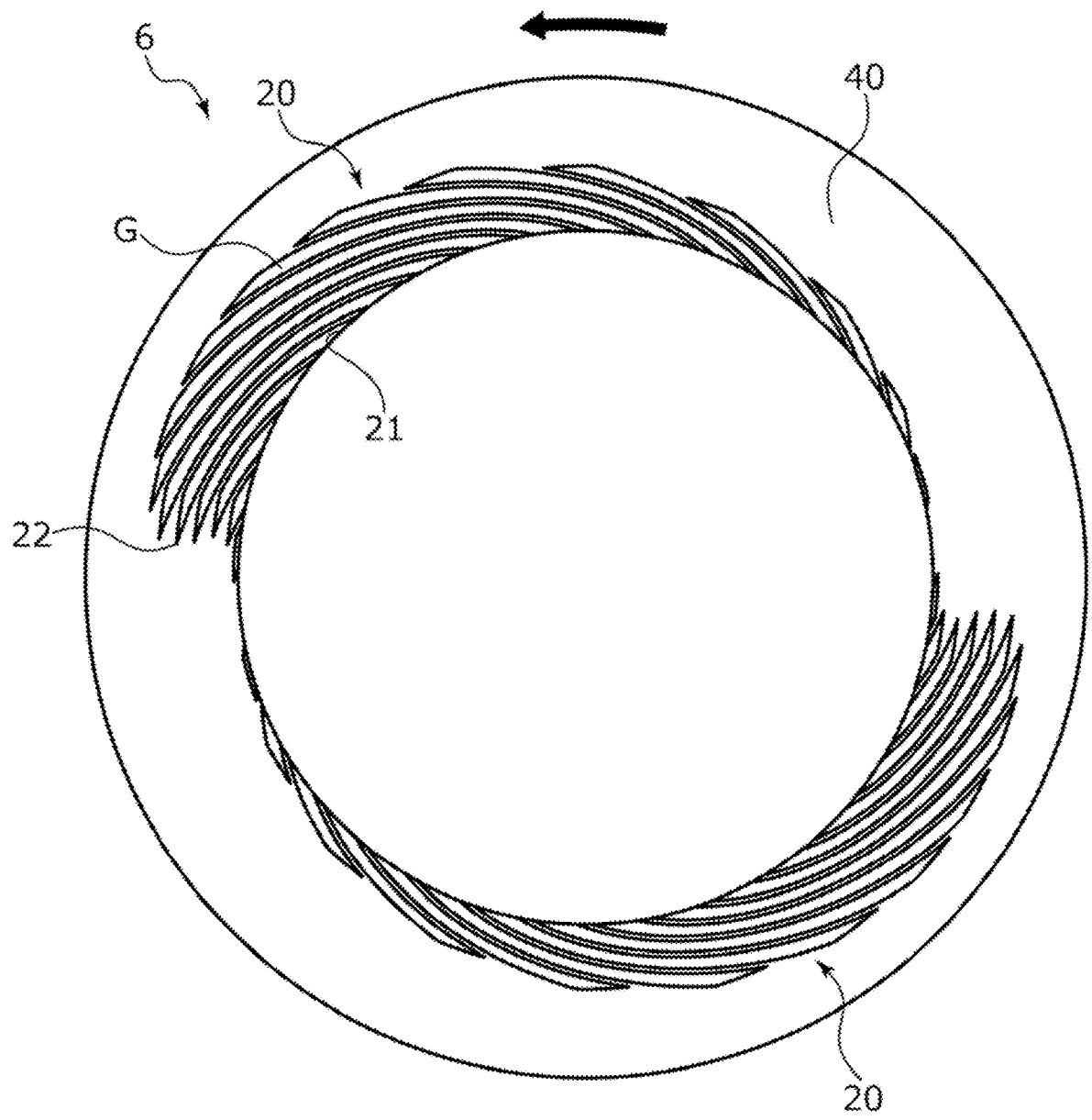
FIG. 7 is a diagram in which a stationary seal ring of a third modified example is viewed from a sliding surface side.

Further, a case in which the mechanical seal having the stationary seal ring 6 corresponding to the sliding component of the above-described embodiment is of an inside type has been described as an example, but the mechanical seal may be of an outside type which is a type that seals a fluid being about to leak from the inner periphery of the sliding surface S to the outer periphery. In this case, as in a third modified example illustrated in FIG. 7, the dynamic pressure generating grooves G constituting the dynamic pressure generating groove group 20 is used for a fluid lubricating operation by generating a dynamic pressure using the sealed fluid on the inner peripheral edge side at the end point 22 closing in the sliding surface S while the start point 21 opens to the inner peripheral edge side of the sliding surface S. Further, in the case of this configuration, the large land portion 40 connected between two dynamic pressure generating groove groups 20 and on the outer radial side of the dynamic pressure generating groove group 20 is secured.

Figure 8:
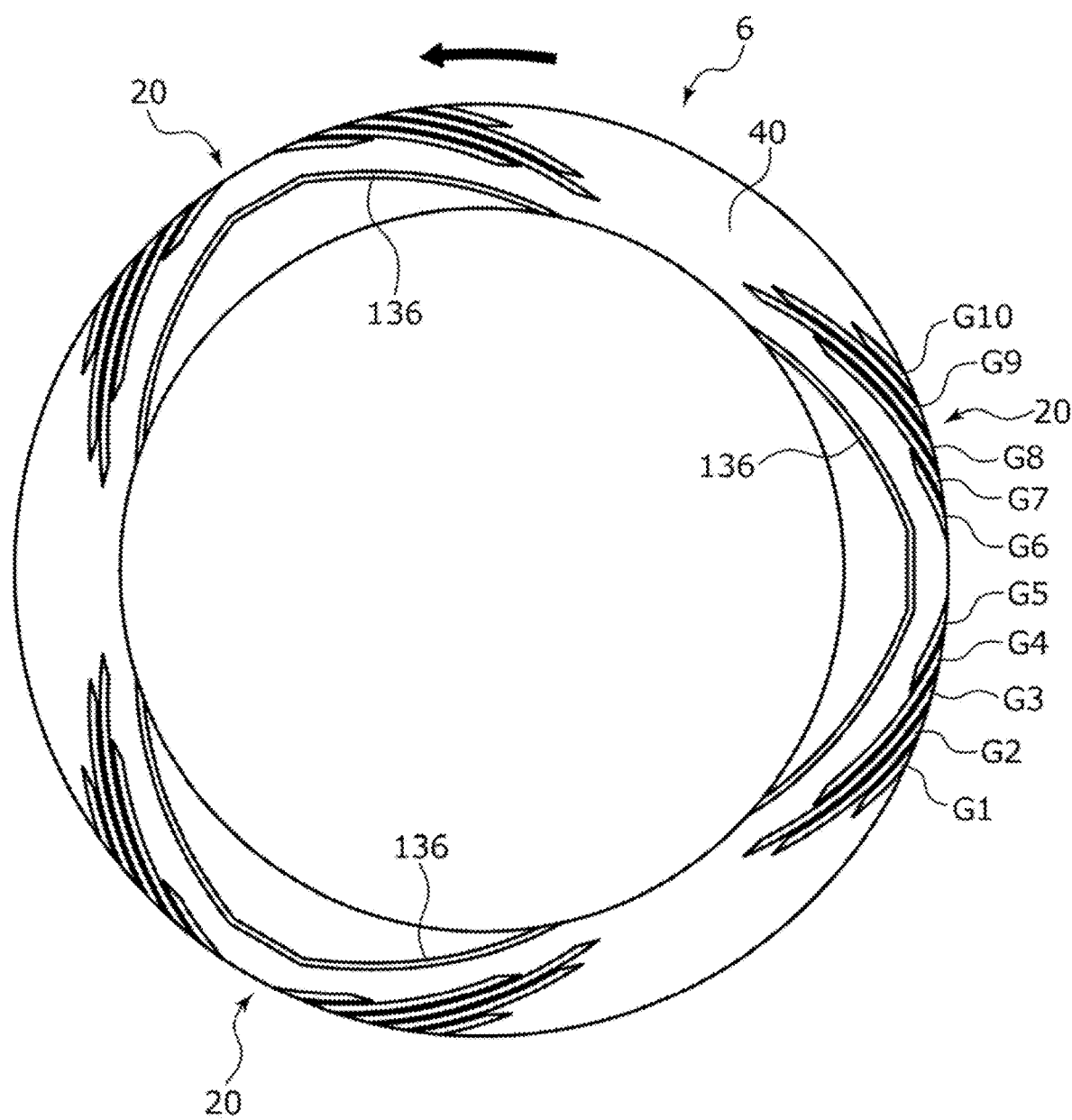
FIG. 8 is a diagram in which a stationary seal ring of a fourth modified example is viewed from a sliding surface side.

Further, in a fourth modified example illustrated in FIG. 8, the end points of the dynamic pressure generating grooves G constituting the dynamic pressure generating groove group 20 are located to be separated from each other in the circumferential direction so that five circumferential end portions G1 to G5 are line-symmetrical with respect to five circumferential end portions G6 to G10. Further, a line-symmetrical auxiliary fluid circulating groove 136 is provided as the other groove in the land portion 40 connected between two dynamic pressure generating groove groups 20 and on the inner radial side of the dynamic pressure generating groove group 20 so that the start point and the end point open together at the inner radial edge side. Accordingly, there is an effect of handling both sliding directions and securing a groove unprocessed section having a size capable of stably holding a fluid film between the dynamic pressure generating groove groups 20. In addition, the present invention is not limited to a case in which the dynamic pressure generating groove group is defined as a combination of sub-groove groups formed in the same direction from the dynamic pressure generating grooves G1 to G5 and sub-groove groups formed in the same direction from the dynamic pressure generating grooves G6 to G10, but two sub-groove groups may be respectively defined as different dynamic pressure generating groove groups.

Figure 9:
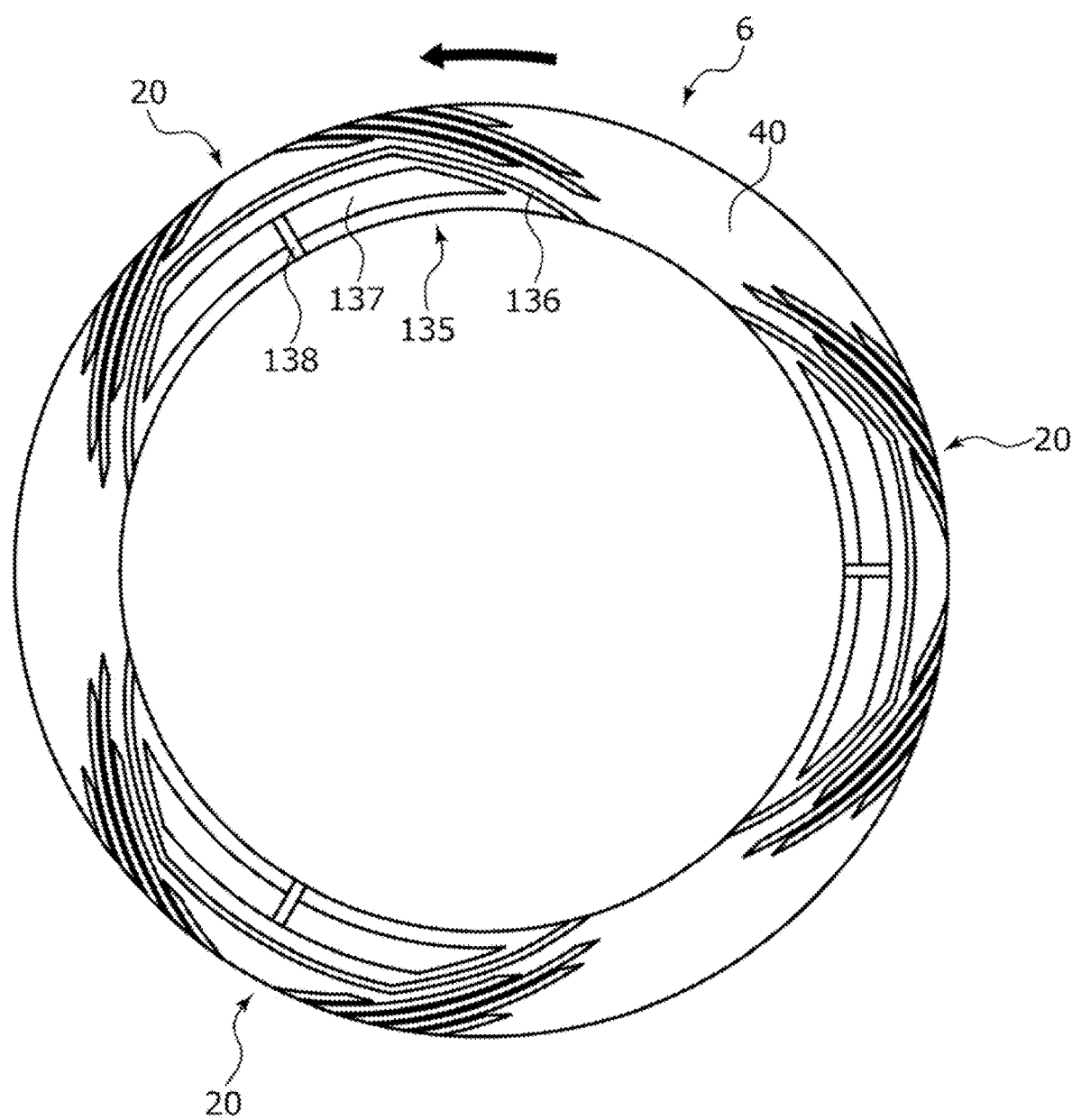
FIG. 9 is a diagram in which a stationary seal ring of a fifth modified example is viewed from a sliding surface side.

Further, as in a fifth modified example illustrated in FIG. 9, the other groove 135 provided in the land portion 40 may include an auxiliary fluid circulating groove 136, a line-symmetrical auxiliary dynamic pressure generating groove 137 formed inside the auxiliary fluid circulating groove 136, and an introduction groove 138 having a start point opening to the inner radial edge side and communicating with the auxiliary dynamic pressure generating groove 137. Accordingly, the lubricity can be improved by the auxiliary dynamic pressure generating groove 137.

Figure 10:
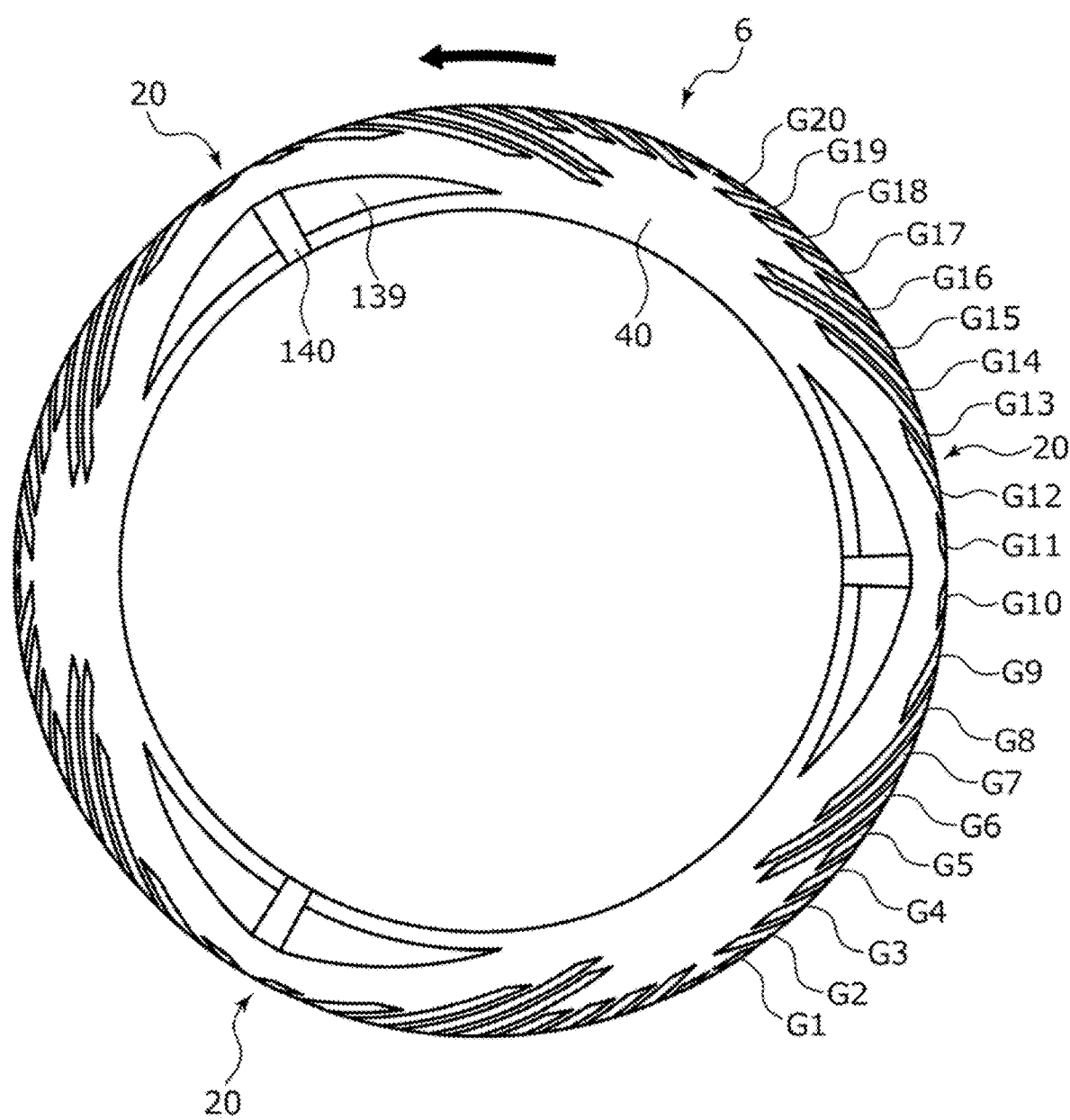
FIG. 10 is a diagram in which a stationary seal ring of a sixth modified example is viewed from a sliding surface side.

Further, in a sixth modified example illustrated in FIG. 10, the end points of the dynamic pressure generating grooves G constituting the dynamic pressure generating groove group 20 are located to be separated from each other in the circumferential direction so that ten circumferential end portions G1 to G10 are line-symmetrical with respect to ten circumferential end portions G11 to G20. Further, the land portion 40 connected on the inner radial side of the dynamic pressure generating groove group 20 within the range of the dynamic pressure generating groove group 20 in the circumferential direction is provided with a line-symmetrical auxiliary dynamic pressure generating groove 139 which is the other groove and an introduction groove 140 which extends in the radial direction, has a start point opening to the inner radial edge side, and communicates with the auxiliary dynamic pressure generating groove 139. Accordingly, it is possible to handle both sliding directions and improve the lubricity by the auxiliary dynamic pressure generating groove 139.

Figure 11:
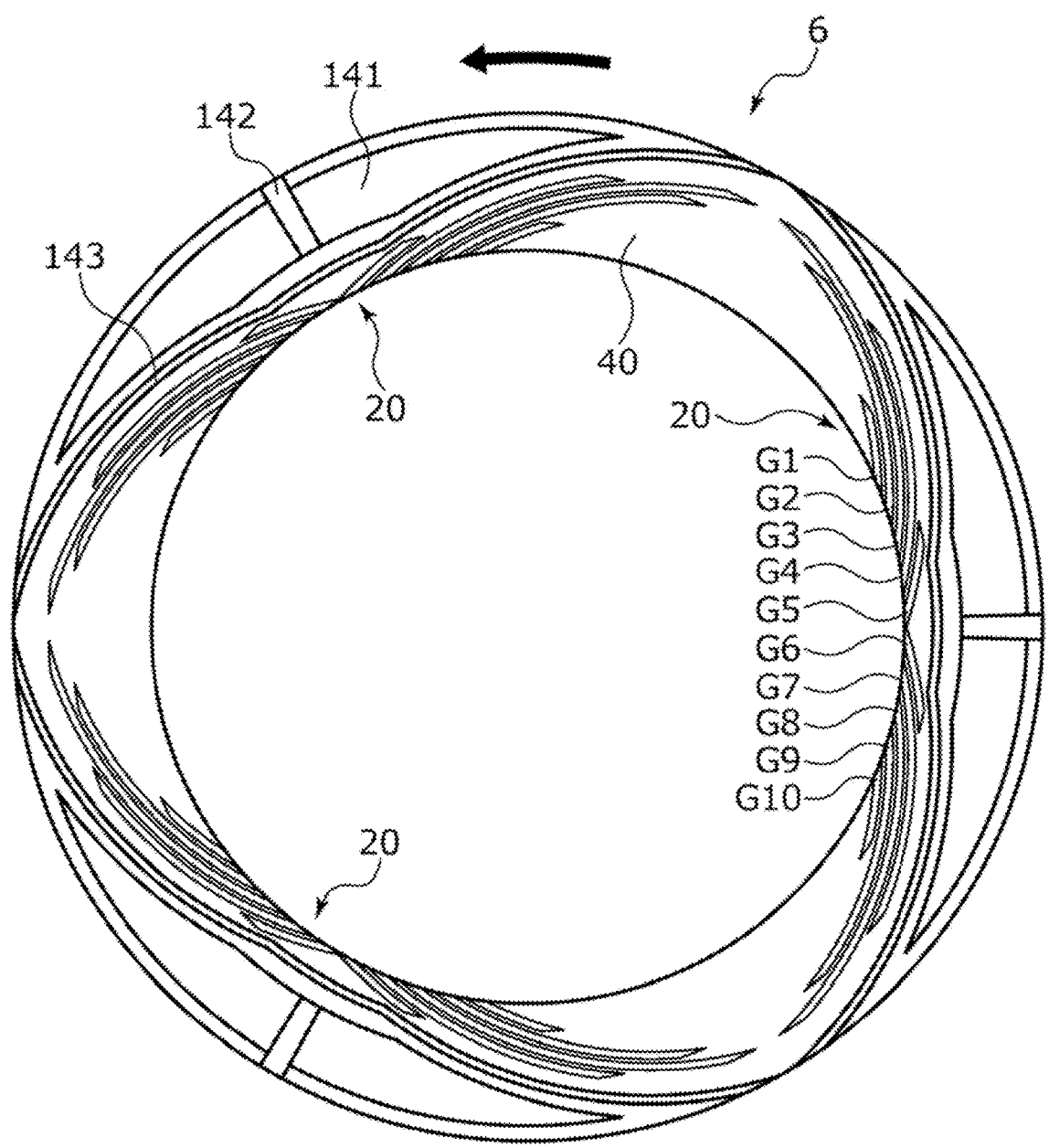
FIG. 11 is a diagram in which a stationary seal ring of a seventh modified example is viewed from a sliding surface side.

Further, a seventh modified example illustrated in FIG. 11 is of an outside type which is a type that seals a fluid being about to leak from the inner periphery of the sliding surface S to the outer periphery thereof and the end points of the dynamic pressure generating grooves G constituting the dynamic pressure generating groove group 20 are located to be separated from each other in the circumferential direction so that five circumferential end portions G1 to G5 are line-symmetrical with respect to five circumferential end portions G6 to G10. Further, the land portion 40 connected on the outer radial side of the dynamic pressure generating groove group 20 within the range of the dynamic pressure generating groove group 20 in the circumferential direction is provided with a line-symmetrical auxiliary dynamic pressure generating groove 141 which is the other groove, an introduction groove 142 which extends in the radial direction, has a start point opening to the outer radial edge side, and communicates with the auxiliary dynamic pressure generating groove 141, and a line-symmetrical auxiliary fluid circulating groove 143 which has a start point and an end point opening together to the inner radial edge side between the dynamic pressure generating groove group 20 of the land portion 40 and the auxiliary dynamic pressure generating groove 141 in the radial direction. Accordingly, it is possible to handle both sliding directions and improve the lubricity by the auxiliary dynamic pressure generating groove 141 and the auxiliary fluid circulating groove 143.

Further, in the above-described embodiments, a case in which the dynamic pressure generating groove G and the dynamic pressure generating groove group 20 are formed in the sliding surface S of the stationary seal ring 6 has been described, but the present invention is not limited thereto. For example, the dynamic pressure generating groove and the dynamic pressure generating groove group may be formed in the sliding surface of the rotating seal ring 3.

Further, the land portion 30 between the dynamic pressure generating grooves G constituting the dynamic pressure generating groove group 20 may not be flush with the land portion 40 connected between two dynamic pressure generating groove groups 20 and on the inner radial (outer radial) side of the dynamic pressure generating groove group 20. For example, the land portion 30 between the dynamic pressure generating grooves G constituting the dynamic pressure generating groove group 20 may be formed to be lower than the land portion 40 so that a fluid easily moves between the dynamic pressure generating grooves G constituting the dynamic pressure generating groove group 20 and a dynamic pressure generated on the front end side of the dynamic pressure generating groove group 20 can be made substantially uniform in the radial direction.

Further, the dynamic pressure generating groove G is not limited to have the curved shape, but may have, for example, a linear shape which is inclined with respect to the circumferential direction and the radial direction or a shape in which a line is bent.

Further, in the above-described embodiments, the dynamic pressure generating grooves G8 to G10 located at the center part have been exemplified as the dynamic pressure generating grooves which are long in the circumferential direction. However, when it is assumed that the dynamic pressure generating grooves G1 and G17 located at both side ends are the dynamic pressure generating grooves located at the side part, the dynamic pressure generating grooves located at the center part are the dynamic pressure generating grooves G2 to G16. In contrast, when it is assumed that the dynamic pressure generating groove G9 is the dynamic pressure generating grooves located at the center part, the dynamic pressure generating grooves located at the side part are the dynamic pressure generating grooves G1 to G8 and G10 to G17. That is, the dynamic pressure generating grooves located at the center part and the dynamic pressure generating grooves located at the side part can be defined and analyzed from a relative difference in circumferential length.

Further, in the above-described embodiments, a case in which the dynamic pressure generating grooves G located at the center part of the dynamic pressure generating groove group 20 are formed to be longer than the dynamic pressure generating grooves G located at the side part in the circumferential direction has been described. However, since the dynamic pressure generating groove G includes a component extending in the circumferential direction and a component extending in the radial direction, it can be rephrased that the total length in the longitudinal direction of the dynamic pressure generating grooves G located at the center part of the dynamic pressure generating groove group 20 is longer than that of the dynamic pressure generating grooves G located at the side part.

Further, the plurality of dynamic pressure generating grooves at the center part may be formed to be the longest or the plurality of dynamic pressure generating grooves located at the side part may have the same length.

Further, the incident angles including the circumferential component and the radial component of the plurality of dynamic pressure generating grooves G constituting the dynamic pressure generating groove group 20 may be different from each other. In this case, the dynamic pressure generating groove G which is not the longest in the circumferential direction may have the end point 22 closest to the inner peripheral edge.

Further, the present invention is not limited to the configuration in which the plurality of dynamic pressure generating grooves G constituting the dynamic pressure generating groove group 20 have the same width except for the front end portion 23. For example, the width may gradually decrease from the start point 21 toward the end point 22 or the plurality of dynamic pressure generating grooves G may have different widths.

Further, the function structure provided in the groove unprocessed section is not limited to the configuration of the other groove 35 and may be a groove or dimple for temporarily storing a fluid taken in from the inner periphery or the outer periphery.

Further, the other sliding surface S of the rotating seal ring 3 or the stationary seal ring 6 relatively sliding on the rotating seal ring 3 or the stationary seal ring 6 having the dynamic pressure generating groove G formed in the sliding surface S may be flat without any groove or may be provided with the same dynamic pressure generating groove group 20. For example, the function structure as the other groove may be formed.

Further, a case in which the sliding components of the above-described embodiments constitute the mechanical seal has been described as an example, but the present invention is not limited thereto. For example, the sliding components can be used in a thrust bearing.

REFERENCE SIGNS LIST

1 Rotation shaft
2 Sleeve
3 Rotating seal ring
4 Housing
5 Seal cover
6 Stationary seal ring
7 Urging means
20 Dynamic pressure generating groove group
21 Start point
22 End point
23 Front end portion
30, 40 Land portion
35 Other groove
36 Auxiliary fluid circulating groove
37 Auxiliary dynamic pressure generating groove
G (G1 to 17) Dynamic pressure generating groove
S Sliding surface

The invention claimed is:

1. A sliding component formed into an annular shape for being disposed at a relatively rotating position of a rotating machine,
    wherein a sliding surface of the sliding component has a first radial edge and a second radial edge opposed to the first radial edge in a radial direction and is provided with at least three dynamic pressure generating groove groups arranged in a circumferential direction, each of the dynamic pressure generating groove groups including a plurality of dynamic pressure generating grooves having a start point opening at the first radial edge of the sliding surface and an end point closing within the sliding surface while extending circumferentially,
    wherein the dynamic pressure generating groove provided between the dynamic pressure generating grooves located at both ends of each of the dynamic pressure generating groove groups is formed to be longer than the dynamic pressure generating grooves located at the both ends of each of the dynamic pressure generating groove groups in the circumferential direction, and the end points of the dynamic pressure generating grooves of each of the dynamic pressure generating groove groups are unevenly distributed to one side of the dynamic pressure generating groove group in the circumferential direction, and
    radial distances between the second radial edge of the sliding surface and end portions of the dynamic pressure generating grooves included in each of the dynamic pressure generating groove groups have at least three different dimensions.

2. The sliding component according to claim 1,
wherein the plurality of dynamic pressure generating grooves curvedly extend to form into a spiral around a center of the sliding surface.

3. The sliding component according to claim 1,
wherein the dynamic pressure generating groove provided between the dynamic pressure generating grooves located at the both ends of each of the dynamic pressure generating groove groups extends so as to approach the second radial edge of the sliding surface more than the dynamic pressure generating grooves located at both ends extend.

4. The sliding component according to claim 1,
wherein a land portion of the sliding surface formed between and radially inward the dynamic pressure generating groove groups are flush with grooveless sections of the sliding surface between the dynamic pressure generating grooves included in each of the dynamic pressure generating groove groups.

5. The sliding component according to claim 1,
wherein the dynamic pressure generating grooves of each of the dynamic pressure generating groove groups are divided into a center part and two side parts sandwiching the center part therebetween in the circumferential direction, and the end points of the dynamic pressure generating grooves of the side parts are continuously separated from the end points of the dynamic pressure generating grooves of the center part in the radial direction and becomes gradually shorter as it goes away from the dynamic pressure generating grooves of the center part.

6. The sliding component according to claim 1,
wherein the dynamic pressure generating groove groups are disposed point-symmetrically with a center of the sliding surface as a symmetric point.

7. The sliding component according to claim 5,
wherein the dynamic pressure generating grooves of the center part of each of the dynamic pressure generating groove groups is formed so that the start points thereof are deeper than that of the dynamic pressure generating grooves of the side parts.

8. The sliding component according to claim 1,
wherein each of the dynamic pressure generating grooves are formed so that a depth thereof becomes shallower from the start point toward the end point.

9. A sliding component formed into an annular shape and disposed at a relatively rotating position of a rotating machine,
wherein a sliding surface of the sliding component has a first radial edge and a second radial edge opposed to the first radial edge in a radial direction and is provided with a plurality of dynamic pressure generating groove groups arranged in a circumferential direction, each of the dynamic pressure generating groove groups including a plurality of dynamic pressure generating grooves having a start point opening at the first radial edge of the sliding surface and an end point closing within the sliding surface while extending circumferentially,
the dynamic pressure generating groove groups is classified into a first dynamic pressure generating groove groups each disposed on one side in the circumferential direction and a second dynamic pressure generating groove groups each disposed on the other side in the circumferential direction,
the dynamic pressure generating grooves of the first dynamic pressure generating groove groups extend from the start points thereof toward the one side in the circumferential direction,
the dynamic pressure generating grooves of the second dynamic pressure generating groove groups extend from the start points thereof toward the other side in the circumferential direction,
the dynamic pressure generating groove provided between the dynamic pressure generating grooves located at both ends of each of the first dynamic pressure generating groove groups is formed to be longer than the dynamic pressure generating grooves located at the both ends of each of the first dynamic pressure generating groove groups in the circumferential direction,
the dynamic pressure generating groove provided between the dynamic pressure generating grooves located at both ends of each of the second dynamic pressure generating groove groups is formed to be longer than the dynamic pressure generating grooves located at the both ends of each of the second dynamic pressure generating groove groups in the circumferential direction,
the end points of the dynamic pressure generating grooves of each of the first dynamic pressure generating groove groups are unevenly distributed to the one side of each first dynamic pressure generating groove group in the circumferential direction,
the end points of the dynamic pressure generating grooves of each of the second dynamic pressure generating groove groups are unevenly distributed to the other side of each second dynamic pressure generating groove group in the circumferential direction,
radial distances between the second radial edge of the sliding surface and end portions of the dynamic pressure generating grooves included in each of the first dynamic pressure generating groove groups have at least three different dimensions, and
radial distances between the second radial edge of the sliding surface and end portions of the dynamic pressure generating grooves included in each of the second dynamic pressure generating groove groups have at least three different dimensions.

10. The sliding component according to claim 9,
wherein the plurality of dynamic pressure generating grooves curvedly extend to form into a spiral around a center of the sliding surface.

11. The sliding component according to claim 9,
wherein the dynamic pressure generating groove provided between the dynamic pressure generating grooves located at the both ends of each of the dynamic pressure generating groove groups extends so as to approach the second radial edge of the sliding surface more than the dynamic pressure generating grooves located at both ends extend.

12. The sliding component according to claim 9,
wherein a land portion of the sliding surface formed between and radially inward the dynamic pressure generating groove groups are flush with grooveless sections of the sliding surface between the dynamic pressure generating grooves included in each of the dynamic pressure generating groove groups.

13. The sliding component according to claim 9,
wherein the dynamic pressure generating grooves of each of the dynamic pressure generating groove groups are divided into a center part and two side parts sandwiching the center part therebetween in the circumferential direction, and the end points of the dynamic pressure generating grooves of the side parts are continuously separated from the end points of the dynamic pressure generating grooves of the center part in the radial direction and becomes gradually shorter as it goes away from the dynamic pressure generating grooves of the center part.

14. The sliding component according to claim 9,
wherein, in the first dynamic pressure generating groove groups and the second dynamic pressure generating groove groups, the dynamic pressure generating grooves of each group are divided into a center part and two side parts sandwiching the center part therebetween in the circumferential direction, and the end points of the dynamic pressure generating grooves of the side parts are continuously separated from the end points of the dynamic pressure generating grooves of the center part in the radial direction and becomes gradually shorter as it goes away from the dynamic pressure generating grooves of the center part.

15. The sliding component according to claim 9,
wherein the dynamic pressure generating groove groups are disposed point-symmetrically with a center of the sliding surface as a symmetric point.

16. The sliding component according to claim 9,
wherein the dynamic pressure generating grooves of the center part of each of the dynamic pressure generating groove groups is formed so that the start points thereof are deeper than that of the dynamic pressure generating grooves of the side parts.

17. The sliding component according to claim 9,
wherein each of the dynamic pressure generating grooves are formed so that a depth thereof becomes shallower from the start point toward the end point.

* * * * *